US010873548B2

(12) United States Patent
Brown et al.

(10) Patent No.: US 10,873,548 B2
(45) Date of Patent: *Dec. 22, 2020

(54) REAL-TIME MESSAGING PLATFORM WITH ENHANCED PRIVACY

(71) Applicant: SlamAd.com, Inc., Deer Park, NY (US)

(72) Inventors: Steven Richard Brown, Oyster Bay Cove, NY (US); Leonard Robert Butterman, Merrick, NY (US); Anthony Pisciotto, Jr., Huntington, NY (US)

(73) Assignee: SlamAd.com, Inc., Deer Park, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/831,129

(22) Filed: Mar. 26, 2020

(65) Prior Publication Data

US 2020/0228477 A1 Jul. 16, 2020

Related U.S. Application Data

(63) Continuation of application No. 16/664,678, filed on Oct. 25, 2019, now Pat. No. 10,645,041, which is a
(Continued)

(51) Int. Cl.
*H04M 1/64* (2006.01)
*H04L 12/58* (2006.01)
(Continued)

(52) U.S. Cl.
CPC ............ *H04L 51/046* (2013.01); *H04L 51/16* (2013.01); *H04L 51/38* (2013.01);
(Continued)

(58) Field of Classification Search
CPC ....... H04L 51/046; H04L 51/16; H04L 51/38; H04L 63/0245; H04L 63/0407; H04L 67/306; H04W 4/14
(Continued)

(56) References Cited

U.S. PATENT DOCUMENTS 6,771,290 B1 8/2004 Hoyle
7,275,419 B2 10/2007 Raffer
(Continued)

FOREIGN PATENT DOCUMENTS

WO WO 2003/088690 10/2003
WO WO 2012/093396 7/2012
WO WO 2015/0026405 2/2015

OTHER PUBLICATIONS

"How to Write Advertisements That Sell", by SYSTEM, The Magazine of Business, Copyright 1912, by A.W. Shaw Company (book images scanned by Examiner).
(Continued)

*Primary Examiner* — Md S Elahee
(74) *Attorney, Agent, or Firm* — Knobbe, Martens, Olson & Bear LLP

(57) ABSTRACT

A real-time messaging system platform receives from, a communication application installed on a first user communication device, a first user identifier, an indication that a messaging service message composed by the first user is being directed to a first destination associated with a second user, and an identification of data present in the messaging service message. The identification of the data and a message transmission history of the first user is used to enable selection of a message of a first entity. The selected message of the first entity is caused to be displayed by the communication application within a message framework that frames the first user messaging service message. The first entity message is caused to be included in the messaging service message transmitted to the second user device, wherein the first entity is not provided with access to the identity of the first user or the second user.

29 Claims, 19 Drawing Sheets

Related U.S. Application Data continuation-in-part of application No. 16/359,400, filed on Mar. 20, 2019, now Pat. No. 10,516,636, which is a continuation of application No. 15/148,846, filed on May 6, 2016, now abandoned, which is a continuation of application No. 14/572,404, filed on Dec. 16, 2014, now abandoned.

(60) Provisional application No. 61/922,848, filed on Jan. 1, 2014.

(51) Int. Cl.
*H04L 29/06* (2006.01)
*H04L 29/08* (2006.01)
*H04W 4/14* (2009.01)

(52) U.S. Cl.
CPC ...... *H04L 63/0245* (2013.01); *H04L 63/0407* (2013.01); *H04L 67/306* (2013.01); *H04W 4/14* (2013.01)

(58) Field of Classification Search
USPC .............................. 379/88.22–88.28; 709/203
See application file for complete search history.

(56) References Cited

U.S. PATENT DOCUMENTS

| | | | |
|---|---|---|---|
| 7,473,350 B2 | 1/2009 | Brown et al. | |
| 7,548,754 B2 | 6/2009 | Shivaram et al. | |
| 7,747,676 B1 | 6/2010 | Nayfeh | |
| 7,831,462 B2 | 11/2010 | Colson et al. | |
| 7,930,208 B2 | 4/2011 | Sharman et al. | |
| 8,086,489 B2 | 12/2011 | Ramakrishna et al. | |
| 8,423,412 B2 | 4/2013 | Vieri et al. | |
| 8,477,786 B2 | 7/2013 | Myllynen et al. | |
| 8,521,581 B2 | 8/2013 | Belwadi et al. | |
| 8,600,415 B2 | 12/2013 | Merrill et al. | |
| 8,694,021 B2 | 4/2014 | Abhari et al. | |
| 8,797,906 B2 | 8/2014 | Igelman et al. | |
| 8,799,123 B2 | 8/2014 | Kalliola et al. | |
| 8,849,931 B2 | 9/2014 | Virolainen et al. | |
| 8,909,545 B2 | 12/2014 | Vieri | |
| 9,277,043 B1* | 3/2016 | Bladon | H04L 51/32 |
| 9,344,574 B2* | 5/2016 | Demmitt | H04M 3/4878 |
| 2002/0128908 A1 | 9/2002 | Levin et al. | |
| 2004/0101191 A1 | 5/2004 | Seul | |
| 2005/0130685 A1 | 6/2005 | Jenkin et al. | |
| 2005/0216568 A1 | 9/2005 | Walkush | |
| 2007/0244752 A1 | 10/2007 | Bayne et al. | |
| 2007/0281719 A1 | 12/2007 | Bylock et al. | |
| 2008/0033806 A1 | 2/2008 | Howe | |
| 2008/0153520 A1 | 6/2008 | Kirtane et al. | |
| 2008/0154725 A1 | 6/2008 | Flake et al. | |
| 2008/0287150 A1 | 11/2008 | Jiang et al. | |
| 2008/0311934 A1 | 12/2008 | Soderstrom et al. | |
| 2009/0012861 A1 | 1/2009 | Krishnaswamy et al. | |
| 2009/0029721 A1 | 1/2009 | Doraswamy | |
| 2009/0055185 A1 | 2/2009 | Nakade | |
| 2009/0125376 A1 | 5/2009 | Sundaresan et al. | |
| 2009/0222341 A1 | 9/2009 | Belwadi et al. | |
| 2009/0312040 A1 | 12/2009 | Gupta | |
| 2010/0210292 A1 | 8/2010 | Nooren et al. | |
| 2010/0274651 A1 | 10/2010 | Huddleston et al. | |
| 2011/0106626 A1 | 5/2011 | Zender et al. | |
| 2011/0112907 A1 | 5/2011 | Seo et al. | |
| 2011/0251898 A1 | 10/2011 | Scott | |
| 2012/0179550 A1 | 7/2012 | Vieri | |
| 2012/0197721 A1 | 8/2012 | Munro et al. | |
| 2012/0202533 A1 | 8/2012 | Abhari et al. | |
| 2012/0215639 A1 | 8/2012 | Ramer et al. | |
| 2012/0246006 A1 | 9/2012 | Levi | |
| 2012/0284093 A1 | 11/2012 | Evans et al. | |
| 2013/0019296 A1 | 1/2013 | Brandenburg et al. | |
| 2013/0185361 A1 | 7/2013 | Balasubramanian | |
| 2014/0012686 A1 | 1/2014 | Arbon et al. | |
| 2014/0180801 A1 | 6/2014 | Homsany | |
| 2014/0222922 A1 | 8/2014 | Ogawa | |
| 2015/0019665 A1 | 1/2015 | Linner et al. | |
| 2015/0127753 A1 | 5/2015 | Tew | |
| 2015/0186952 A1 | 7/2015 | Brown et al. | |
| 2017/0201485 A1 | 7/2017 | Kim | |

OTHER PUBLICATIONS

Extended European Search Report for European Application 14877208.0, dated Nov. 23, 2016, 8 pages.

International Search Report for PCT Application No. PCT/US2014/071630 dated May 15, 2015, 4 pages.

Written Opinion for PCT Application No. PCT/US2014/071630 dated May 15, 2015, 21 pages.

\* cited by examiner

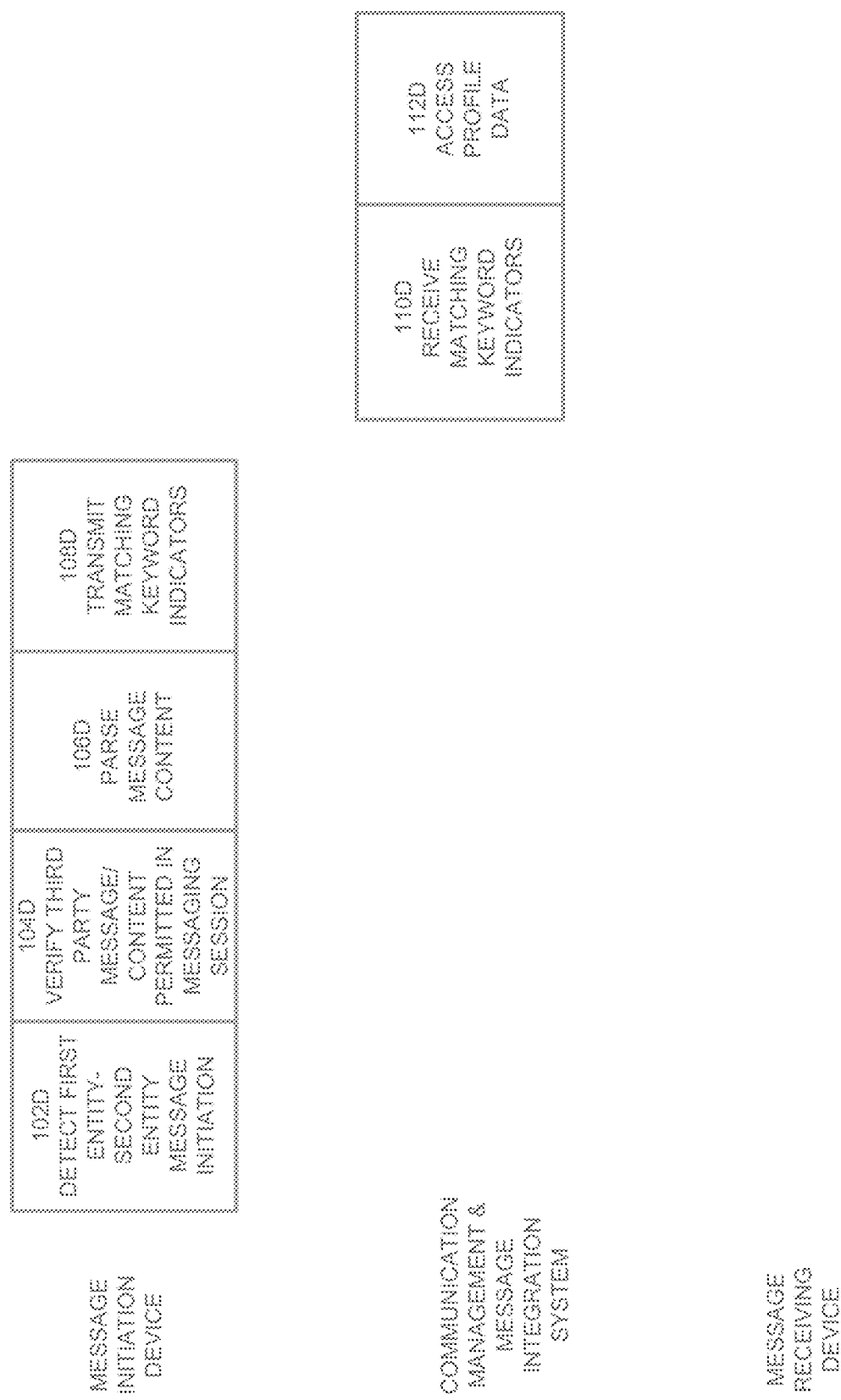
FIG. 1D1

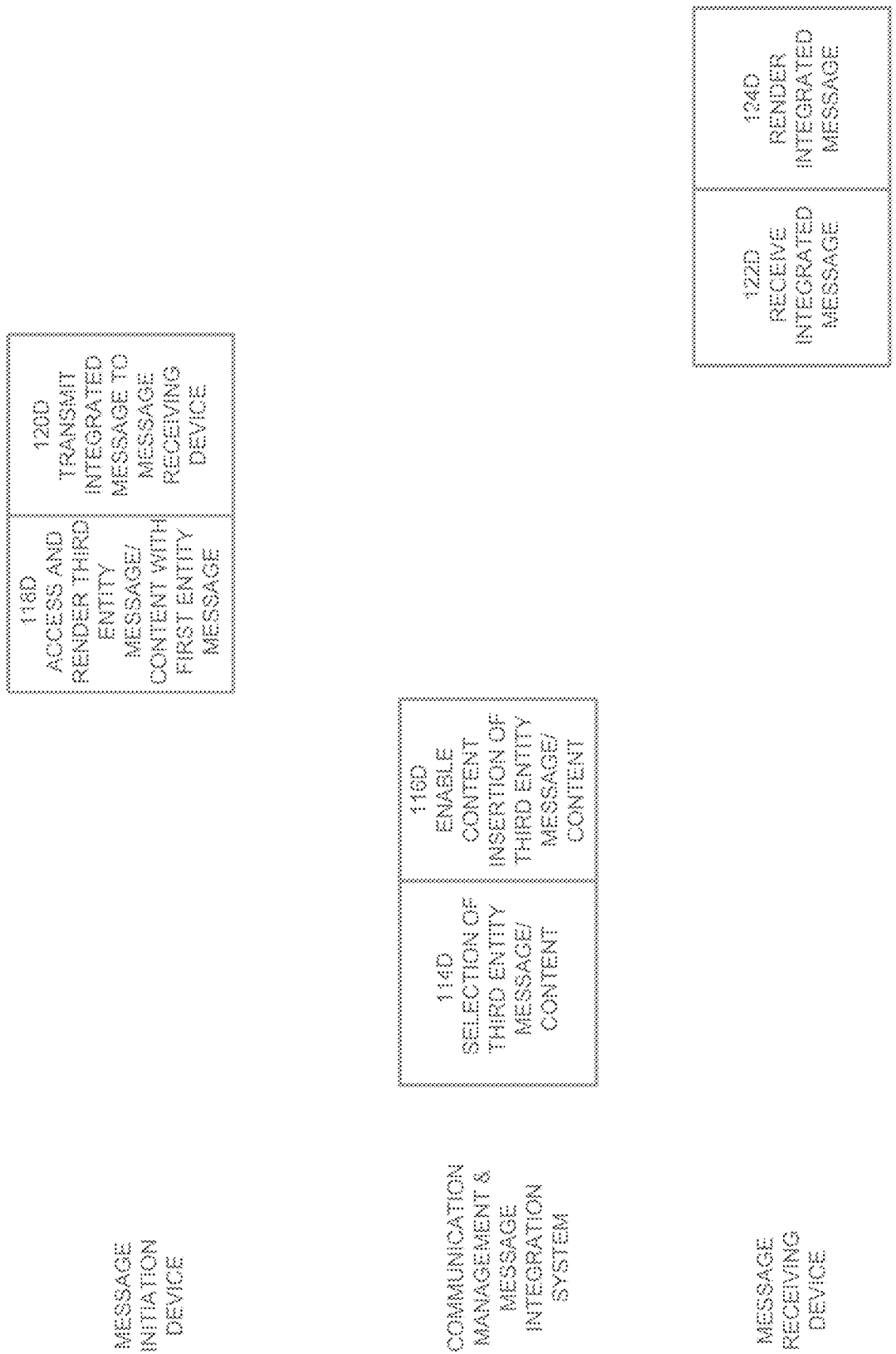
FIG. 1D2

I will meet you at 7PM   700

----------------------------------------

Free soda with the purchase of
large pizza, click here
710

REAL-TIME MESSAGING PLATFORM WITH ENHANCED PRIVACY

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND

Instant messaging, such as SMS or MMS messaging, has become an increasingly important communication channel. However, conventional approaches fail to provide an adequate technical solution to providing identity privacy, particularly in group messaging. Further, conventional approaches to group chats may unduly load messaging infrastructure.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect of the present disclosure relates to a real-time messaging platform and method configured to enable at least two users to conduct an instant messaging session (including one or more messages), while enabling a third party to provide messaging content for the messaging session without requiring either of the two users to add the third party to the messaging session. Thus, a third party message may be automatically added to a message being sent from a first user to second user. The third party may be inhibited from accessing the identifies or phone numbers of the two users.

Advantageously, by embedding a third-party message into a two-party (or more than two party) messaging session, the number of individual messages transmitted over the messaging infrastructure is reduced, thereby reducing stress and messaging infrastructure loading. Further, by embedding a third-party message into a messaging session, the number of times the parties engaged in the messaging session need to access their communication devices to view messages is reduced, saving user time and effort. In addition, because the number of separate messages is reduced, the messaging conversation may be performed faster. Yet further, when a third party message is presented in the same message outline as a message of a first of the other parties engaged in the messaging conversation, the total amount of display space on the first and second parties' communication devices needed to display the third party's and other party's messages is reduced. Still further, a two-way messaging session is transformed into a three-way messaging conversation without requiring the parties in the messaging conversation to set up a three party messaging group. Additionally, a three party messaging session may be performed (including the third party message(s)), where none of the participants needs to enter or know the addresses (e.g., telephone numbers) of all three participants, reducing the time needed to enter addresses (e.g., mobile phone numbers) into a call list to establish a group messaging session, and reducing the amount of memory utilized on a user device to store such addresses.

An aspect of the present disclosure relates to a real-time messaging system platform receiving, from a communication application installed on a first user communication device, a first user identifier, an indication that a messaging service message composed by the first user is being directed to a first destination associated with a second user, and an identification of keywords present in the messaging service message. The identification of the keywords and a message transmission history of the first user is used to enable selection of a message of a first entity. The selected message of the first entity is caused to be displayed by the communication application within a message framework that frames the first user messaging service message. The first entity message is caused to be included in the messaging service message transmitted to the second user device, wherein the first entity is not provided with access to the identity of the first user or the second user.

An aspect of the present disclosure relates to a communication system comprising: a network interface; at least one computing device; a non-transitory computer-readable medium having computer-executable instructions stored thereon that, if executed by the at least one computing device, cause the at least one computing device to perform operations comprising: receiving over the network interface from a communication application installed on a first communication device of a first user: an identifier associated with the first user and/or an identifier associated with the communication application installed on the first communication device; an indication that a messaging service message composed by the first user is being directed to a first electronic destination associated with a second user; an identification of keywords present in the messaging service message composed by the first user; accessing a record associated with the first user using the identifier associated with the first user and/or the identifier associated with the communication application installed on the first communication device, wherein the record associated with the first user comprises a message transmission history of the first user; based at least in part on the identification of keywords present in the messaging service message composed by the first user and on the message transmission history of the first user, enabling selection of a message of a first entity; causing the selected message of the first entity to: be displayed by the communication application installed on the first communication device of the first user within a message framework that also frames the messaging service message composed by the first user; included in the messaging service message when the messaging service message is transmitted to the second user, wherein the first entity is not provided with access to the identity of the first user or the second user.

An aspect of the present disclosure relates to a computer implemented method of modifying a messaging service message, comprising: receiving at a mobile device of a first user, via an instantiation of a first application installed on the mobile device of the first user, content provided by a content provider; detecting that the first user has instructed the first application installed on the mobile device of the first user to transmit a first messaging service message to a device of a second user, the first messaging service message including a message comprising text entered by the first user, wherein the message comprising text entered by the first user does not include the content from the content provider; determining if the first user has transmitted, using the first application, a first threshold number of messaging service messages to the device of the second user; at least partly in response to determining that the first application has transmitted the first threshold number of messaging service messages from the first user to the device of the second user, causing, at least in part, the first messaging service message to automatically include the content from the content provider with the message entered by the first user within the same message graphical outline; and causing at least in part, the content from the content provider to be displayed in association with the message entered by the first user when displayed on the device of the second user.

An aspect of the present disclosure relates to a system comprising: a network interface; at least one computing device; a non-transitory computer-readable medium having computer-executable instructions stored thereon that, if executed by the at least one computing device, cause the at least one computing device to perform operations comprising: receiving over the network interface from a communication application installed on a first communication device of a first user: a first identifier; an indication that the first user has activated a message transmit control to cause a messaging service message composed by the first user to be transmitted to a first electronic destination associated with a second user; an identification of keywords present in the messaging service message composed by the first user; accessing a record associated with the first user, wherein the record associated with the first user comprises profile data associated with the first user; based at least in part on the identification of keywords present in the messaging service message composed by the first user and on the record associated with the first user, enabling selection of a message of a first entity; causing the selected message of the first entity to: be displayed by the communication application installed on the first communication device of the first user together with the messaging service message composed by the first user, and to be included in the messaging service message when the messaging service message is transmitted to the second user.

BRIEF DESCRIPTION OF THE DRAWINGS

Embodiments will now be described with reference to the drawings summarized below. Throughout the drawings, reference numbers may be re-used to indicate correspondence between referenced elements. The drawings are provided to illustrate example embodiments described herein and are not intended to limit the scope of the disclosure.

FIGS. 1D1-1D2 illustrates an example messaging process.

FIG. 2 illustrates another example messaging process.

FIGS. 4-14 illustrate example messaging interfaces.

DETAILED DESCRIPTION

Figure 1A:
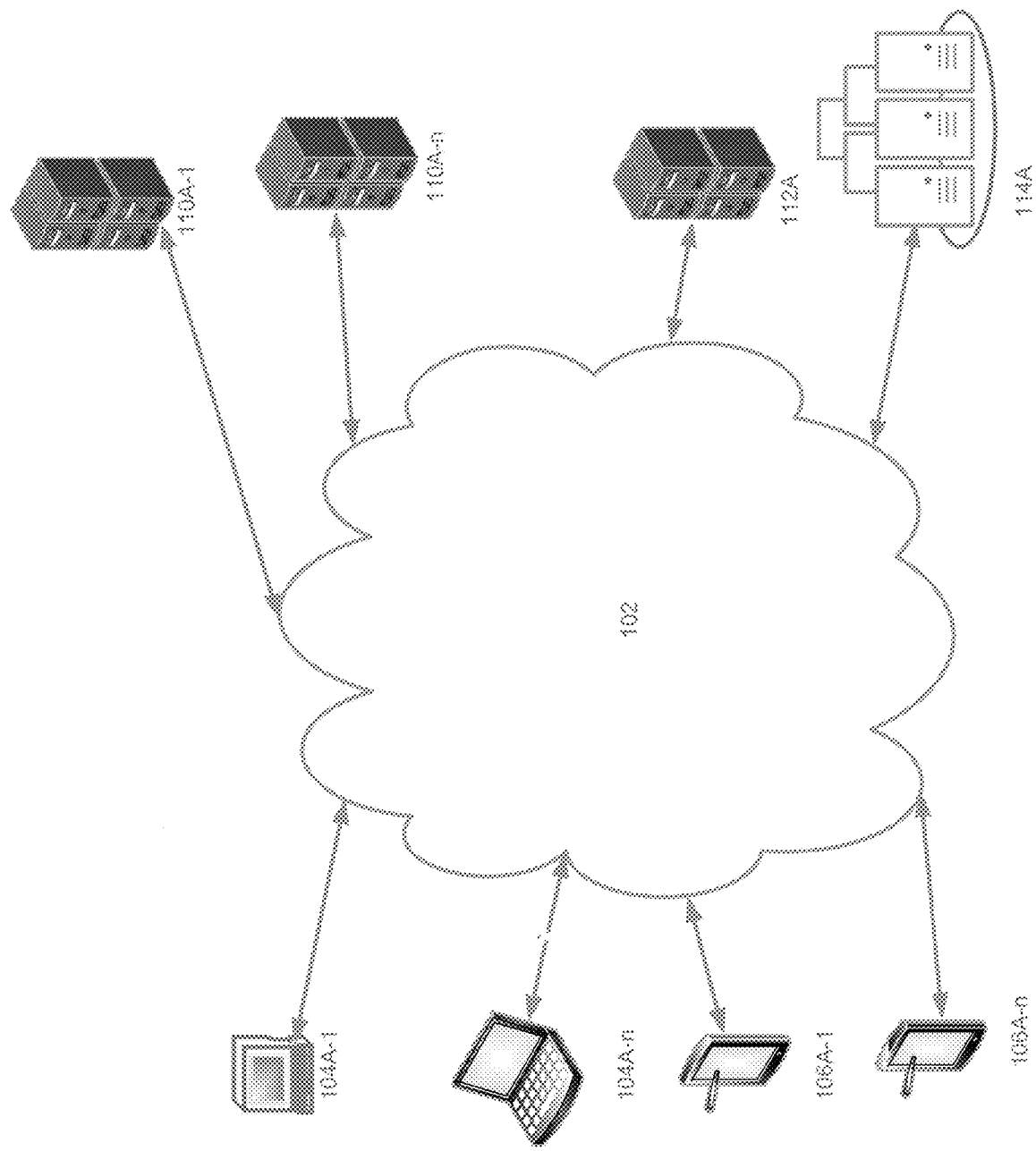
FIG. 1A illustrates an example environment which may be used in performing real-time messaging.

As discussed above, instant messaging, such as SMS or MMS messaging, has become an increasingly important communication channel. However, conventional approaches fail to provide an adequate technical solution to providing identity privacy, particular in group messaging. Further, conventional approaches to group chats may unduly load messaging infrastructure.

Disclosed herein are systems and methods for overcoming some or all of the foregoing disadvantages of conventional technologies. An aspect of the present disclosure relates to a real-time messaging platform and methods configured to enable two (or more) users to conduct an instant messaging session (including one or more messages), while enabling a third party to provide messaging content to be included in one or more of the messages between the two or more users. The systems and methods disclosed herein optionally provide some or all of the following advantages.

Advantageously, by embedding a third-party message into a two-party (or more than two party) messaging conversation (e.g., a text chat), the number of individual messages transmitted over the messaging infrastructure is reduced, thereby reducing stress and messaging infrastructure loading. Further, by embedding a third-party message into a messaging conversation, the number of times the parties engaged in the messaging conversations need to access their communication devices to view messages is reduced.

In addition, because the number of separate messages is reduced, the messaging conversation may be performed faster. Yet further, when a third party message is presented in the same message outline as a message of one of the other parties engaged in the messaging conversation, the total amount of display space on the party's communication device needed to display the third party's and other party's messages is reduced. Further, a two-way messaging conversation is transformed into a three-way messaging conversation without the need the parties in the messaging conversation to set up a three party messaging group. Additionally, a three party messaging conversation may be performed (including the third party message(s)), where none of the participants needs to enter or know the addresses (e.g., telephone numbers) of all three participants, reducing the time needed to enter addresses (e.g., mobile phone numbers) into a call list to establish a group messaging (chat) conversation, and reducing the amount of memory utilized on a user device to store such addresses.

Further, a third party message may be embedded into a user message, while preserving the privacy of the two (or more) people involved in a message communication (e.g., a text chat) as well as that of a third party whose message(s) are being embedded into one of the two or more peoples' messages. For example, the two (or more) people involved in a message communication need not be provided with access to a cell phone number of the third party, and the third party does not need the cell phone numbers of the two people involved in the message communication. Yet, the third party can still provide messages to the two (or more) people as part of the message communication conducted via the cell phones (or other communication devices) of the two people involved in the message communication.

For example, as will be described in greater detail herein, a user may enter a message (e.g., a text message, a graphic message (e.g., emoji, sticker, etc.), an image message (e.g., a still image, video, GIF, screen effect, etc.), an audio, message, or combination of two or more of the foregoing) via a user interface. The message may include a link (e.g., a URL) to a network resource such as a webpage or other document, such that when the user interacts with the content (e.g., clicks on, touches, points at, or otherwise interacts with the content), the network resource is accessed. If the network resource comprises still further content, the content may be displayed by the user device.

The user may also identify one or more message recipients (e.g., by entering a name, phone number, email address, or other destination identifier, or by selecting a recipient from a contact database defined by the user, or via a menu). The user interface may be generated via a communication application hosted on a user device. Optionally, a user interface may be provided requesting permission for the communication application to access the user's contact database. In response to the user granting such permission, the communication application may provide the user with access to the contact database (via a contact selection user interface) when selecting message recipients. The communication application may optionally enable the user to define a communications group and to select/enter the members of the group for future communications. Optionally, a user interface may be provided by the communication application requesting permission for the communication application to access the user's camera. In response to the user granting such permission to access the camera, the communication application may enable the user take photographs/videos using the camera for inclusion in messages to other users. Optionally, a user interface may be provided requesting permission for the communication application to access the user's image data store (e.g., photo roll). In response to the user granting such permission to access the image data store, the communication application may enable the user to select images from the image data store for inclusion in messages to other users. Optionally, a user interface may be provided enabling the user to select emojis from a library of emojis for inclusion in messages to other users.

The user device may be mobile communication device (e.g., a smart phone, tablet computer, laptop, etc.) or a non-mobile communication device (e.g., a desktop computer, a distributed computer system, a smart television, etc.). The communication application may be pre-installed on the user device or may be downloaded over a network from a remote system (e.g., via an app store or otherwise).

As the user is entering the message or after the user has activated a message transmission control, the application parses the user entered message to determine an indication as to the message content.

For example, if the user message includes text, the message may be parsed to identify words and/or multiword phrases. The words and/or phrases may be compared to a dictionary of keywords and/or multiword phrases and matches may be identified. They keywords or phrases may be associated with certain subject matter and/or third party content. Thus, for example, the identified matches may be utilized to determine subject matter and/or third party content relevant to the user entered message. The matching keywords/phrases may be wirelessly transmitted from the user device (e.g., via a cellular network, via a WiFi network, Bluetooth, ZigBee, etc.) to a remote system (a real-time messaging platform that provides enhanced privacy with respect to third party communications). However, optionally, the entire message is not transmitted to the remote system to better enhance user privacy. For example, although keywords (or representative indicators) may be transmitted to the remote system, other text (e.g., proper names, addresses, phone numbers, other text that may not be useful or sufficiently useful is selecting relevant messages, and/or the like) may not be transmitted to the remote system.

If the message includes an image, an image analysis system may be used to determine the image subject matter. For example, the user device or remote system may access a third party system having pre-trained models (e.g., convolution neural network models) via an application programming interface (API), pass the image to the third party system, and receive the analysis. Optionally, instead, the remote system may host the vision models and perform the analysis. Optionally, a histogram-oriented gradient feature extraction algorithm may be used to identify objects in the image.

If the image includes a text image, optionally optical character recognition is performed to translate the text image to text. The text may be used to determine the image subject matter as similarly discussed above with respect to text messages.

In addition, optionally the application hosted on the user device may also access location data from the user device (e.g., GPS data, WiFi data, cell phone triangulation data, etc.) using corresponding queries to the user device. The application may transmit the location data to the remote system for use in providing geolocation-related services and/or enhancements.

The remote system and/or the user device may store profile data associated with users. For example, the profile data may include demographic data (e.g., age/generation, gender, income, marital status, education, homeownership/ renting, geographical location, etc.), historical user interactions with content, the number of messages sent by and/or received by a user, and/or other information. If the user device stores the profile data, then optionally remote system may access the user profile data from the user device when the user profile data is needed.

Corresponding third party messages/content items may be selected from one or more local or remote data stores. A third party message/content item may be selected based on the identified match, using profile information of the user composing the message and/or the profile information of the identified recipient, and/or the current location information. Optionally, the remote system may transmit over a network some or all of the information received from the communication application hosted on the user device to one or more content provider systems, optionally in conjunction with some or all of the user profile information (optionally, while inhibiting the provision of user names, phone numbers, email addresses, or other personally identifying information). One or more content providers may then request that their message/content item be inserted into the message from the user to the identified recipient. The message/ content item may be selected by the remote system from that stored by the content provider systems. The message/content item may be, for example, news content, weather information content, product data content, service data content, advertising, and/or other message/content item. Optionally, a different message/content item may be selected for and provided to the message interface of the user composing the message and to the identified message recipient.

The remote system may optionally transmit the actual selected message/content item to the communication application hosted on the user device, may transmit a link (e.g., a Uniform Resource Locator) to the communication application, and/or may transmit an identifier associated with an item of content previously stored on the user device.

Optionally, the remote system may only select and transmit message/content item to the application hosted on the user device upon a determination that certain pre-specified criteria are met. For example, the criteria may indicate that third party messages/content items should only be included in a given user's messages periodically (e.g., every message, every third message, every fifth message), and/or at certain times of day (e.g., between 7 AM-9 AM, 12 PM-1 PM, 6 PM-11 PM), and/or on certain days (e.g., only weekdays, only weekends, only Fridays, only Mondays, etc.), and/or only in messages that are directed to recipients that meet certain criteria.

If the application receives a link from the remote system, the communication application may access the message/content item using the link and display the accessed message/content item on the user device together with the user message. If the application receives the actual message/content item, then the communication application may display the received message/content item on the user device together with the user message (optionally with a delimiter, such as a solid or dashed line there between, or presented using different background colors). If the communication application receives an identifier associated with an item of content previously stored on the user device, the application may use the identifier to access the corresponding content from local user device memory, and display content on the user device together with the user message.

For example, the message and the content may be displayed within the same message outline, sometimes referred to herein as a message framework (e.g., a message bubble demarcation outline). By way of illustration, the message outline may be an oval, a circle, or a rectangle or other polygon. The communication application may optionally dynamically size and/or shape the message outline based at least in part on the size (e.g., in pixels) and/or dimensions of the content. The application may optionally color the message outline and/or the background to the message to indicate that the message is being transmitted (as opposed to received). Optionally, the communication application may color the message outline and/or the background to the message in response to a color request by the content provider. Optionally, the message and content are displayed without an outline. Advantageously, the communication application may position the content below the user message to ensure that the user message (which may be of higher user interest as compared to the content) is visible first when viewed by the user composing the message and/or the user receiving the message. Optionally, the content provider may specify the position of the content, and the content may be presented accordingly by the communication application, thereby providing fine-tuned control over the content placement. Optionally, the content may be displayed at other locations (e.g., on the left side of, the right side of, below, or surrounding the user message). Optionally, the content is displayed outside the message outline. Optionally, no message outline is displayed.

The message may be transmitted by the application to the designated destination. Optionally, the message does not traverse the remote system. Instead, the message may be transmitted via one or more third party existing messaging systems (e.g., a carrier SMS (short message service, such as is defined in TS 23.040 or TS 23.041)/MMS (multimedia messaging service) messaging system). For example, the messaging system may be a stateless messaging system. The message communication may be handled using a short message service center (SMSC) providing a store and forward mechanism. The SMSC may determine, via a handshaking signal from the receiving device, whether the receiving device is reachable or received the message. If the receiving device is not reachable or did not receive the message, the SMSC may queue the message, and later attempt to transmit the message again. A failure indication may be transmitted to the user device indicating the failure of the message delivery. The application may display a corresponding message delivery failure indication to the user and/or to the remote system. The remote system may monitor and generate reports of failure deliveries. The remote system may optionally communicate the delivery failure to the content provider. If the message, including the third party message/content is successfully transmitted to the receiving device, a corresponding indication may be recorded. As will be discussed herein, the user may receive tokens/points for such successful transmission, where such tokens/points may be utilized to receive or access products, services, credits, and/or the like.

If the receiving device does not host an iteration of the application, the receiving device may still receive the message with the third party content using its native messaging application. However, certain functionality, such as control over the message outline may reside with the receiving device's native messaging application.

The term, SMS, has used herein is intended to encompass MMS and Internet Protocol-based messaging services, such as APPLE IMESSAGE, FACEBOOK MESSENGER, ANDROID MESSAGE, and other such messaging applications, unless the context explicitly indicates otherwise.

Certain aspects will now be discussed with reference to the figures.

Referring to FIG. 1A, the real-time messaging platform 114A may comprise a hosted computing environment that includes a collection of physical computing resources that may be remotely accessible and may be rapidly provisioned as needed (sometimes referred to as a "cloud" computing environment). The real-time messaging platform 114A may also include a data store. The data store is optionally a hosted storage environment that includes a collection of physical data storage devices that may be remotely accessible and may be rapidly provisioned as needed (sometimes referred to as "cloud" storage).

The plurality of user systems 104A-1 . . . 104A-N and 106A-1 . . . 106A-N may include standalone computers (e.g., desktop, laptop, tablet, smart phone, or other computer device), a centralized computer system, or a cloud computing system. The user systems 104A-1 . . . 104A-N may be associated with users that initiate messages to recipients (e.g., text messages, graphic messages, video messages, etc., via short or multimedia messaging service), and user systems 106A-1 . . . 106A-N may be associated with users that receive messages initiated by the users of the user systems 104A-1 . . . 104A-N. Of course a given user may be a message initiator and a message recipient.

The messages transmitted between 104A-1 . . . 104A-N and 106A-1 . . . 106A-N may be routed via a messaging gateway system 112A. For example, as similarly discussed above, the messaging gateway system 112A may optionally be a third party messaging system (e.g., a carrier SMS (short message service)/MMS (multimedia messaging service) messaging system). The message communication may be handled using a short message service center (SMSC) providing a store and forward mechanism.

Third party messages/content items (e.g., text, graphic, still image, video image, audio, and/or other content) may be hosted and provided via one or more content systems 110A-1 . . . 110A-N (some or all of which may be third party message/content provider systems, such as ad network systems). Optionally, where the third party message/content includes playable content (e.g., video content, animations, audio content, and/or the like), the content may be configured to be automatically played on a user device 104 or 106, without a user needing to activate a play control or link. As discussed elsewhere herein, the real-time messaging platform 114A may select messages/content items from the one or more content systems 110A-1 . . . 110A-N and/or enable the one or more content systems 110A-1 . . . 110A-N to request that their messages/content items be included in messages between user systems 104A-1 . . . 104A-N and user systems 106A-1 . . . 106A-N.

The various systems illustrated in FIG. 1A may communicate over one or more wired and/or wireless networks 102A. For example, the network(s) 102A may include a cellular network, a WiFi network, the Internet, an intranet, and/or other networks.

Figure 1B:
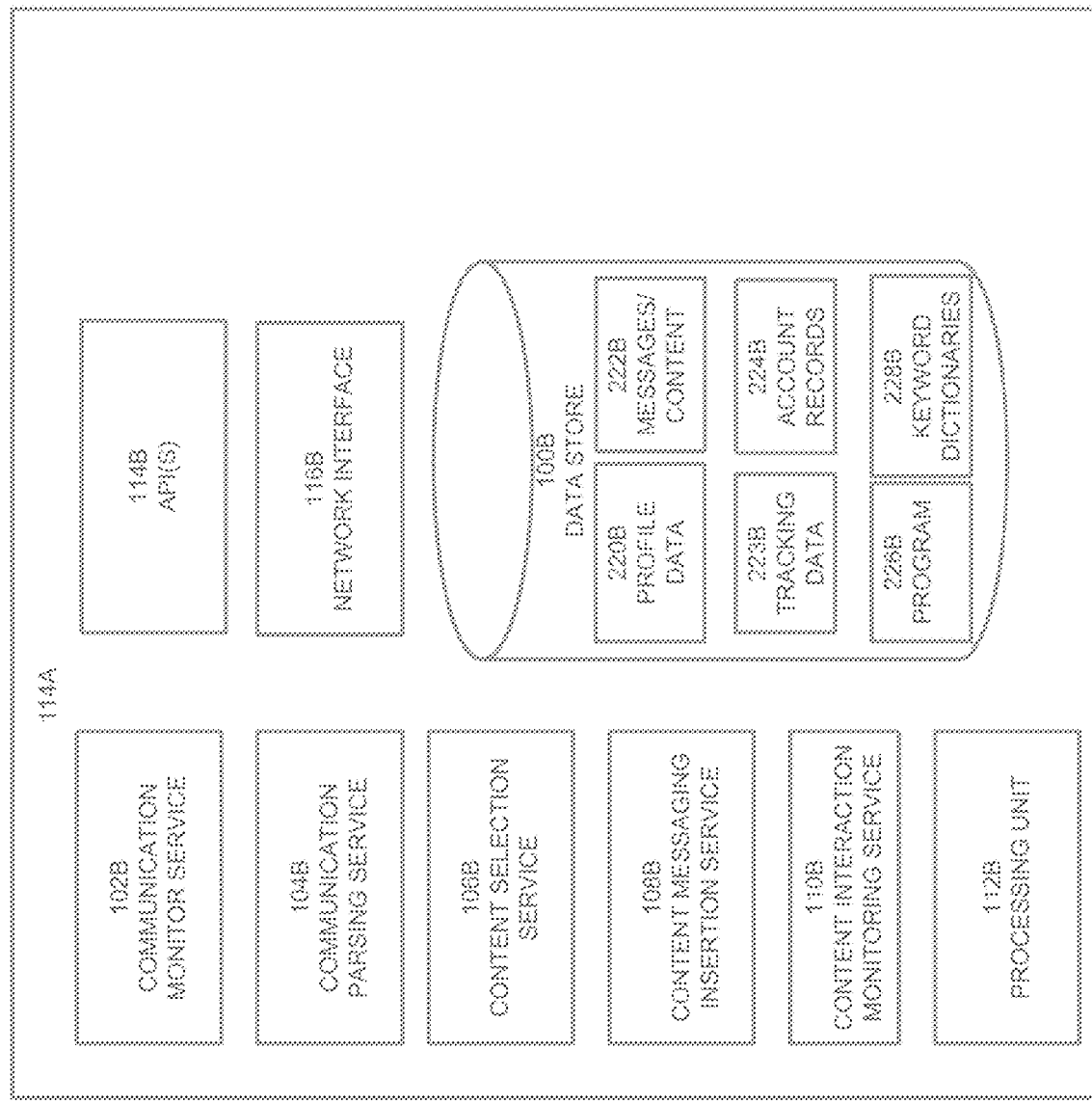
FIG. 1B illustrates an example real-time messaging platform.

FIG. 1B illustrates an example real-time messaging platform 114A in greater detail. The real-time messaging platform 114A includes some or all of the following: a communication monitor service module 102B, a communication parsing service module 104B, a message/content selection service module 106B, a message/content messaging insertion service module 108B, a message/content interaction monitoring service module 110B, a processing unit 112B (configured to execute programs to perform operations described herein), one or more Application Programming Interfaces (APIs) 114B, and a network interface 116B (used to communicate with user systems 104A-1 . . . 104A-N, user systems 106A-1 . . . 106A-N, content systems 110A-1 . . . 110A-N, and/or other systems).

In addition, the example real-time messaging platform 114A includes a data store 100B. The data store 100B may include one or more databases that store user profile data 220B, content/messages 222B (to be inserted into user messages), user content/message interaction tracking data 223B, message/content provider and/or user account records 224B (e.g., storing the user's mobile phone number, email address, preferences, rewards points/tokens, number of messages transmitted by the user via the communication application, and/or other user data described herein), and/or one or more software programs 226B which may be executed by the processing unit (which may include one or more centralized or distributed computing devices). Keyword dictionaries 228B may include one or more keyword dictionaries used to identify or determine the topic of a user message. Optionally, the data store 100B may also store a user profile. The keywords in the keyword dictionaries 228B may be periodically synchronized with keyword dictionaries stored on user systems 104A, 106A based on timing and/or detected updates that add or remove keywords. For example, version numbers or dates associated with the keyword dictionaries stored on user systems 104A, 106A, and if the version numbers or dates indicate that the keyword dictionaries stored on user systems 104A, 106A are out of date, the keywords in the keyword dictionaries 228B may be synchronized with the keyword dictionaries stored on user systems 104A, 106A.

The communication monitor service module 102B may be used to detect when a user of a user system 104A is initiating a message communication. For example, a messaging application hosted on the user system 104A may detect when a user is entering a message into a message field and/or activated a transmit control, and the messaging application hosted on the user system 104A may transmit a corresponding notification over the network 102 to the communication monitor service module 102B. As described elsewhere herein, in response to such message initiation notification, the monitor service module 102B may initiate a third party message/content insertion process. Optionally, the communication monitor service module 102B may receive from the user system 104A an identification of the recipient user (e.g., the recipient user phone number, unique UserID, etc.).

The communication parsing service 104B may receive and analyze data received from the messaging application hosted on the user system 104A related to the content included in the user-entered message. For example, the analyzed data received from the messaging application hosted on the user system 104A may include words/phrases (or identifiers corresponding thereto) that match those words/phrases in a keyword dictionary accessed by the messaging application hosted on the user system 104A.

The message/content selection service module 106B may enable the selection of a message/content item that is to be inserted into the message entered by the user of the user system 104A. For example, the keywords/phrases identified in the user initiated message may be compared to metadata (e.g., tags) associated with content. More than one word/phrase may match more than one item of metadata associated with a third party message/content item. The message/content item whose metadata most closely that of the user message keywords/phrases may be selection for insertion into the user message.

Other factors may be taken into account in selecting a third party message/content item (e.g., user message/content preferences, message/content size, etc.). Optionally, different keyword matches may be weighted differently. For example, a keyword that is more likely to indicate the subject matter of the user message and/or the user's interest in a given subject may be weighted more heavily in selecting message/content, than keywords that are relatively less likely to indicate the subject matter of the user message and/or the user's interest in a given subject. By of example, the use of the phrase "twin scroll turbocharger" may indicate more familiarity with and greater interest in engines and turbochargers as compared to the phrase "turbocharger". Optionally, in addition to or instead of using the keyword matches to select the message/content, user profile information may be utilized in selecting the message/content. For example, a user's historical user interactions with message/content, expressly provided interests (e.g., provided via a user interface form), the number of messages sent by and/or received by a user, and/or other information may be used to determine the user's interests and/or preferences and/or may be used to determine whether the user matches criteria specified by a message/content provider. In addition, the current time of day and/or day of the week may be used in selecting a third party message/content item.

Optionally, the message/content selection service module 106B may select a different message/content item for the user composing the message and for the identified recipient of the message. For example, the profile of the user composing the message and/or the keyword matches may be used in selecting a message/content item for the composing user, and (where the recipient identifier is known and a profile exists for the recipient) the profile of the recipient receiving the message and/or the keyword matches may be used in selecting a message/content item for the recipient user.

The message/content messaging insertion service module 108B may cause the selected message/content to be transmitted to the communication application on the user system 104A and/or the recipient system 106A. The communication application on user system 104A and/or on the recipient system 106A may then insert the selected message/content into the message outline (e.g., below the original user's message).

User interaction with the inserted message/content may be monitored by the message/content interaction monitoring service module 110B. For example, if a link is associated with the inserted third party message/content, the application may detect that a user has activated the link and has been navigated to the linked-to website or other resource. The application may then report the interaction to the interaction monitoring service module 110B each time such detection is made or periodically (e.g., once an hour, once a day, etc., where the report may include interactions detected since the last report). By way of further example, if the third party message/content includes video and/or audio content, the application may detect that a user has initiated the playing of the content (e.g., by tapping on the content or an associated play/volume control), and may transmit a corresponding indication to the interaction monitoring service module 110B. By way of yet further example, activation of a link associated with an inserted third party message/content item may cause a resource hosted by the real-time messaging platform 114A, which may in response record an indication that the user has interacted with the inserted message/content. As discussed elsewhere herein, such detected message/content interactions may be stored (e.g., in data store 100B) and used to generate analysis and reports as to user interests, message/content popularity, and/or other data.

The profile data 220B may include user demographic data (e.g., age/generation, gender, income, marital status, education, homeownership/renting, geographical location, etc.), a record of user interactions with inserted message/content (e.g., third party messages/content inserted into messages sent by the user, interactions with inserted third party messages/content received by the user), user subject matter preferences expressly provided by the user (e.g., via a user preference user interface which lists subject matters that the user can select as being of interest or of no interest), and/or inferred user subject matter preferences (e.g., inferred using a determination as to which content the user has and has not interacted with).

The message/content data 222B may include message/content items that may be selected for insertion into user messages. The stored messages/content may include default content or messages to be displayed if third parties have not requested that their content or messages be inserted into a given user's message. The message/content data 222B may optionally be thirty party messages/content that were cached (e.g., during a time period when the network and/or system utilization is otherwise at a relatively low level), and which may then be later selected for insertion into user messages.

The tracking data 223B may include individual and/or aggregated data regarding user interactions with messages and/or content (e.g., which content has been clicked on or played, and the number of time that content has been clicked on or played), the number of user messages transmitted and/or received using the communication application, and/or the like. Account records 224B may include, for a given individual user, the tracking data discussed above, tokens/points received by the user for the inclusion of third party messages/content into the user's messages, redemption of token/points (e.g., to receive or access products, services, credits, and/or the like), and/or other user data.

The APIs 1148 may be utilized to access or receive content from content systems 110A-1 . . . 110A-N. Different APIs may optionally be used for different content systems.

Figure 1C:
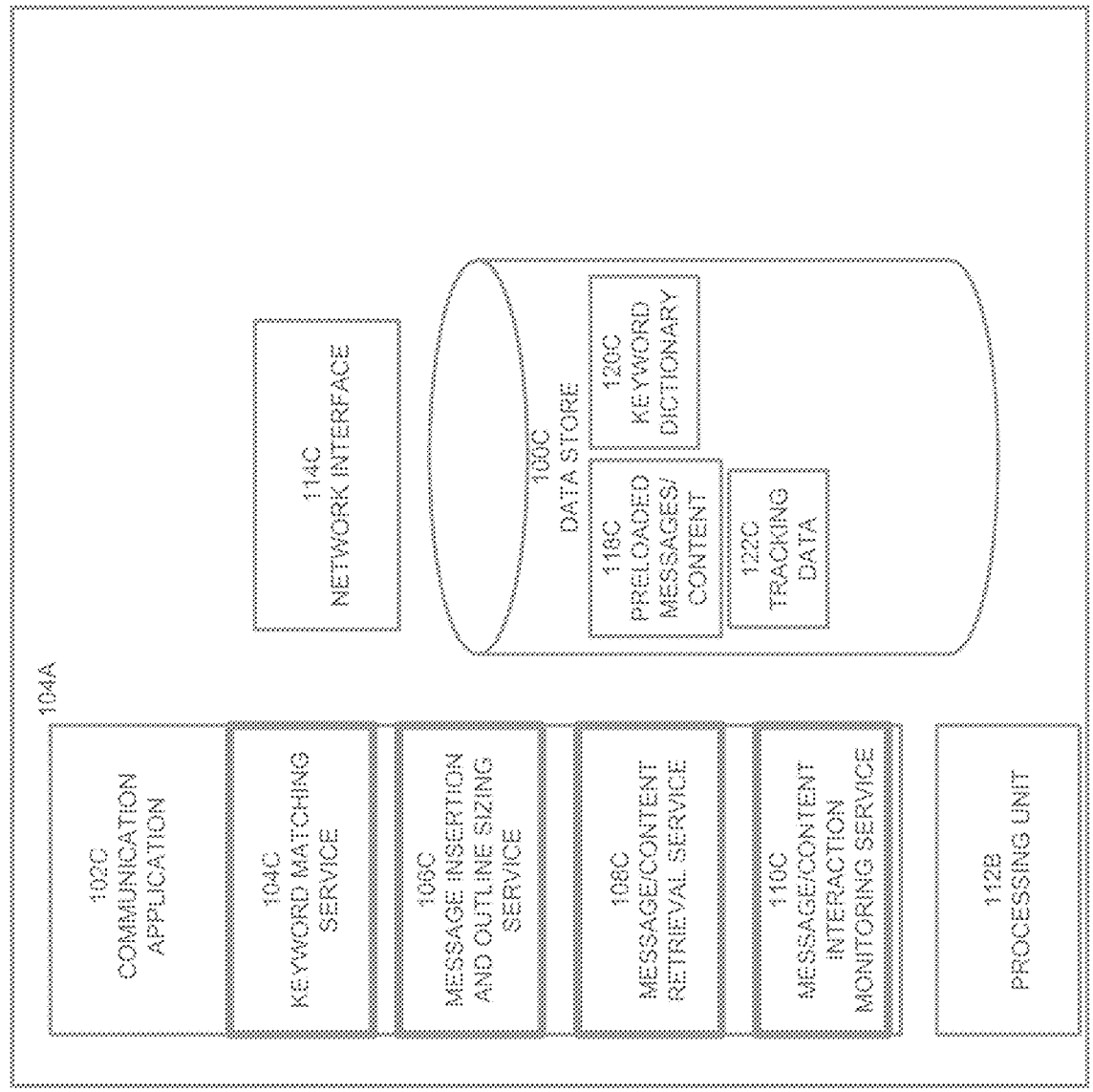
FIG. 1C illustrates an example user system.

FIG. 1C illustrates an example user system 104A (recipient system 106A may have the same or similar architecture if it has a communication application 102C installed thereon). The user system 104A may be a mobile device (e.g., a smartphone, tablet computer, portable gaming device, media player, etc.), a desktop computer, smart television, or other device. The example user system 104A includes a communication application 102C. The communication application 102C may be pre-installed on the user device 104A or may have been downloaded over a network via the network interface 114C from a remote system (e.g., via an app store or otherwise). In this example, the communication application 102C includes a keyword matching service module 104C, a message insertion and outline module 106C, a message/content retrieval service module 108C, and a message/content interaction monitoring service module 110C.

A processing unit 1128 executes the communication application 102C and its various modules. A network interface 114C enables the user system 104A to communicate with other systems and devices, such as those disclosed herein. The example user system 104A may also include a display (e.g., a touch display), speakers, a microphone (to receive voice inputs, such as commands to voice messages), accelerometers, a battery, a keyboard, and/or the like.

A data store 100C may include preloaded messages/content 118C, a keyword dictionary 120C, tracking data 122C, and/or other data. The preloaded content 118C may have been previously selected based on user profile data and/or content provider criteria as similarly discussed herein. For example, the preloaded messages/content 118C may be downloaded when it is detected that the network interface 114C is not being utilized above a certain threshold. Advantageously, this technique ensures that the network interface 114C and/or other components of the user system 104 (e.g., the processing unit 112B) are not unduly loaded and so ensures a more responsive user system 104A. Thus, the user experience may be enhanced by downloading messages and content when the user system 104A or components thereof are not being otherwise utilized or are not being heavily utilized.

The data store 100C may also include a keyword dictionary 120C and tracking data 112C. Optionally, the keyword dictionary 120C may be included in the communication application 102C when downloaded to the user device 104A. Optionally, the keyword dictionary 120C may be separately downloaded from the real-time messaging platform 114A. Optionally, the keyword dictionary 120C may be periodically updated or updated in response to a certain event (e.g., a corresponding update to a keyword dictionary stored on the real-time messaging platform 114A) via a synchronization process performed with the real-time messaging platform 114A.

The keyword matching service module 104C may access a message entered or being entered by the user, compare the user message content (e.g., text) against the dictionary of keywords 120C, and identify matches. The keyword matching service module 104C may transmit the matching keywords and/or associated identifiers to the real-time messaging platform 114A (optionally with the recipient identifier), which in turn can use the matching keywords to select third party messages/content to insert into the user message. Optionally, the communication application 102C may use the matching keywords to select a third party message/content from the preloaded messages/content 118C.

The message insertion and outline module 106C may receive the selected third party message/content and insert the selected into the message outline. The message insertion and outline module 106C may determine the width and height of the message/content (e.g., in pixels) and/or font size (for text content) and use the size information to dynamically adjust the size of the message outline. The message insertion and outline module 106C may also determine the placement of the third party message/content relative to the user message. For example, the third party message/content may be positioned below the user message so that the user message may be viewed first and the user composing the message or the message recipient does not have to scroll down to view the user-composed message. Optionally, however, the third party message/content may be positioned above the user message so that the third party message/content may be viewed first. The message insertion and outline module 106C may also set the shape (e.g., rectangle, oval, star, etc.) and/or color of the message outline based on shape and color metadata stored with the third party message/content or in response to a command received over a network from the content provider system or the real-time messaging platform 114A.

The message/content retrieval service module 108C may be configured to retrieve locally or remotely stored content for insertion into a user message.

Figure 1E:
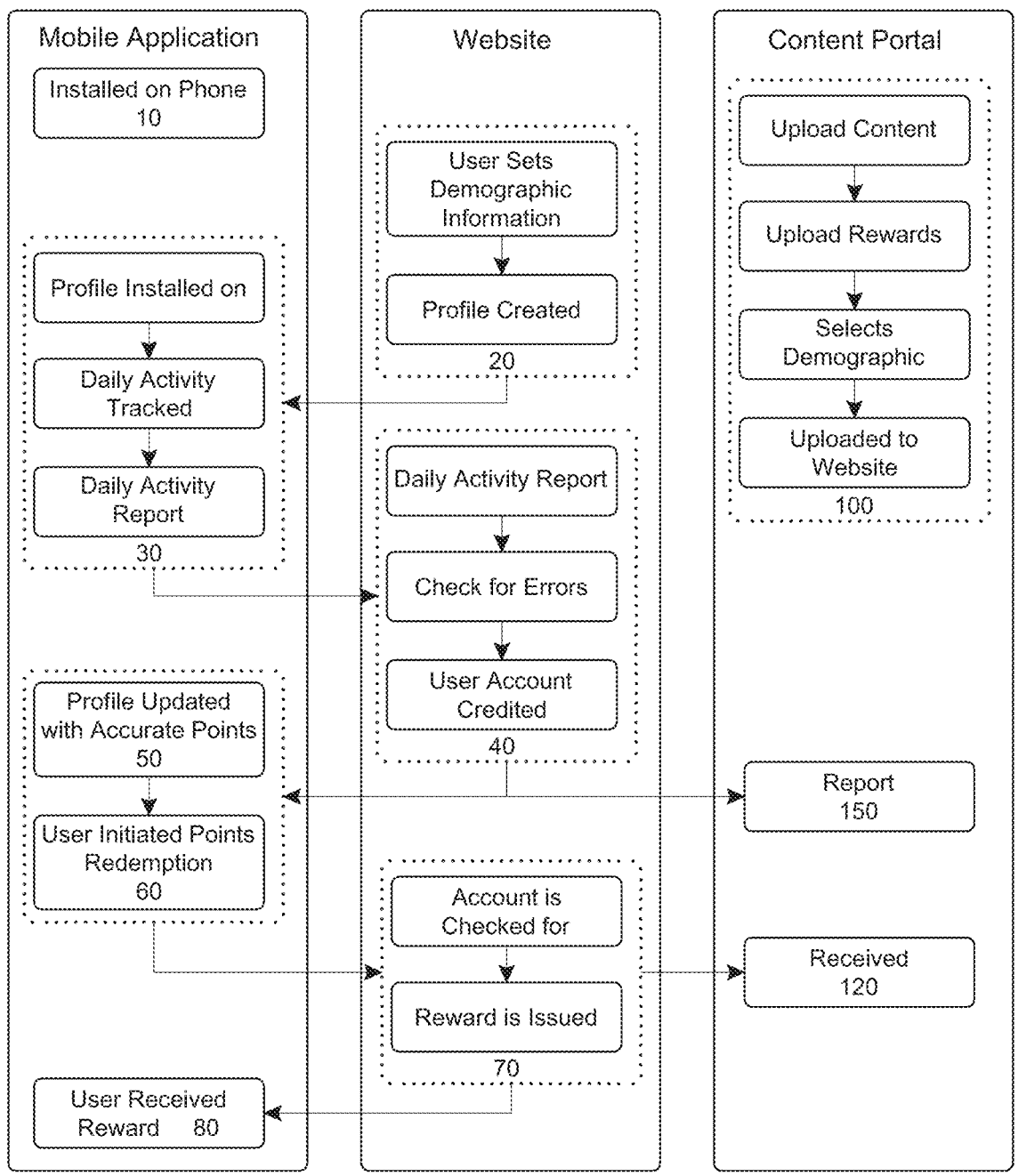
FIG. 1E illustrates an example message monitoring process.
Figure 2:
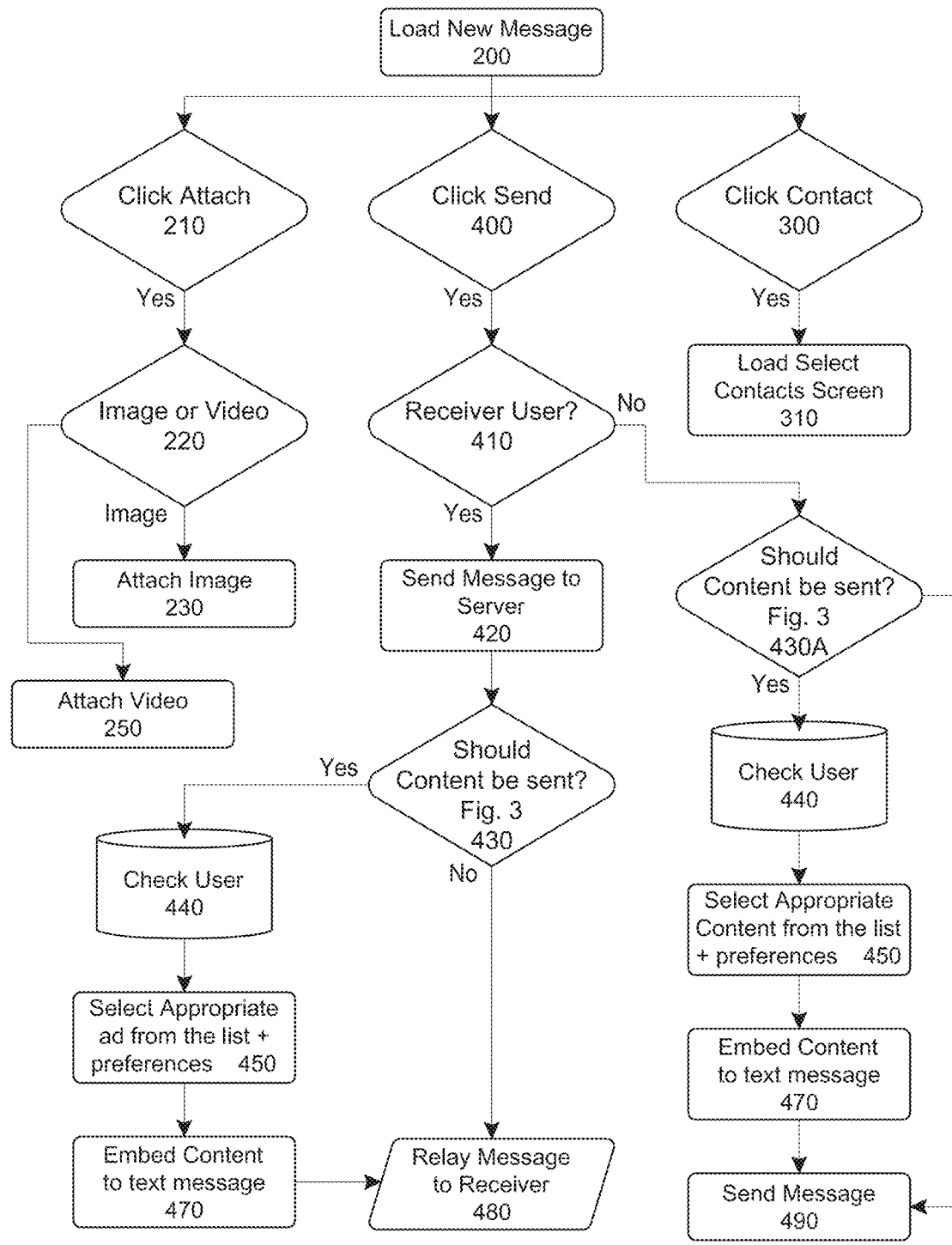

FIGS. 1D1-1D2 illustrates an example real-time process configured to insert selected third party messages/content into a user message, while preserving the privacy of the two (or more) people involved in a message communication (e.g., a text chat) as well as that of a third party whose message(s) are being embedded into one of the two or more peoples' messages. For example, the two (or more) people involved in a message communication need not be provided with access to a cell phone number of the third party, and the third party does not need the cell phone numbers of the two (or more) people involved in the message communication. Yet, the third party can still provide messages to the two (or more) people as part of the message communication conducted via the cell phones (or other communication devices) of the two (or more) people involved in the message communication. The illustrated process or portions thereof may be combined with other portions and blocks of other process discussed herein.

At block 102D, a message initiation device (e.g., user system 104A) detects (e.g., using a communication application) that a user is initiating a message. The detection may be performed when the user activates a "new message" control to cause a message entry field to be presented, begins actually entering a message (e.g., by typing text, starting a voice recording, starting a video recording, entering a graphic, and/or entering an emoji message) via a message editing interface, enters/selects a recipient identifier (e.g., a phone number, user identifier, or otherwise), or activates a message transmission control (e.g., a "send" control).

At block 104D, a determination is made as to whether a third party message/content item is permitted to be inserted into the user message. For example, the user initiating the message may have indicated (e.g., via a message insertion inhibition control provided via the user message editing user interface) to inhibit the insertion of a third party message/content item into this particular user message. Optionally, the user may have previously indicated, via a corresponding user interface, the no third party messages/content are to be included in messages to the identified recipient. For example, a user may not want third party messages/content included in any messages from the user to a business contact. Thus, the user may identify business contacts to whom third party messages/content are not to be included. If the user has indicated that the recipient is not to have third party messages/content included, the process may end.

If the user has permitted (not prohibited) third party messages/content to be inserted into the user message, the process may proceed.

At block 106D, the communication application on the message initiation device may parse the user message to determine the subject of or keywords in the message. For example, if the message is a text message, the text message words/phrases may be compared to those in a keyword dictionary, and matches may be identified. The matching keywords (or codes associated therewith) may be transmitted, at block 108D, to a communication management & message integration system in association with an identifier associated with the application instantiated on the message initiation device and/or an identifier associated with the user initiating the message. If the message includes a graphic or image, metadata associated with the graphic or image may be compared to the keyword dictionary, and the matching keywords (or codes associated therewith) may be transmitted to the communication management & message integration system.

At block 110D, the communication management & message integration system receives the keyword indications (e.g., the matching keywords, keyword codes, or other indicators) from the message initiation device and receives the identifier associated with the application instantiated on the message initiation device and/or an identifier associated with the user initiating the message. Optionally, the message initiation device also receives an indication as to the message recipient (e.g., phone number, or other recipient identifier) from the message initiation device.

At block 112D, the communication management & message integration system accesses from a profile data store a profile of the user initiating the message and/or the profile of the recipient. The message initiator profile may be accessed via a database query using the application instantiation identifier or the identifier associated with the user initiating the message. The message recipient profile may be accessed via a database query using the message recipient indicator. Optionally, if the user profile is stored on the message initiation device, the user profile may be accessed from the message initiation device by the communication management & message integration system.

At block 114D, the communication management & message integration system selects one or more third party messages/content items to insert into the user message. For example, the matching keywords, message initiator profile, and/or the message recipient profile may be compared to data, such as third party message/content (or associated metadata), to identify matching content. Optionally, if the message receiving device has an instantiation of the communication application installed thereon, a separate third party message/content may be selected for the message recipient. If there is more than one match, optionally the message/content whose data most closely matches may be selected.

Other criteria may be used in performing the selection. For example, an indication may be stored in a user account for each third party message/content item that has previously been included in a given message initiator message. Optionally, the system may inhibit the selection of third party messages/content items that may previously have been inserted into a message of the message initiator and/or of the message recipient, even if such third party messages/content items may be the most closely matching content/messages. Optionally, still other criteria may be taken into account in selecting third party messages/content items for inclusion into a user message. For example, third party content/message providers may offer tokens (e.g., a currency bid) to have their content/messages inserted into the message initiator's message, and the token amount may be taken into account in selecting the third party content/message.

At block 116D, the communication management & message integration system enables the selected third party message/content item into the message initiator's message. For example, the communication management & message integration system may transmit the selected message/content or a link (e.g., a URL) thereto to the communication application on the message initiation device. If the message receiving device has an instantiation of the communication application installed thereon, the communication management & message integration system may transmit the third party message/content, or a link thereto, selected for the recipient to the communication application on the message initiation receiving device.

At block 118D, the message initiation device (using the communication application) may access and render the received selected third party message/content. For example, if the message initiation device received a link to the third party message/content, the message initiation device may access the content over the network using the link.

At block 120D, the message initiation device may transmit the message, integrated with the third party message/content to the designated recipient. As noted above, optionally instead or in addition, the communication management & message integration system may transmit selected message/content or a link thereto to the message receiving device.

At block 122D, the message receiving device receives the integrated message. At block 124D, the message receiving device renders the integrated message.

Optionally, because of the architecture described herein, the foregoing process may be completed in less than 4 seconds, or between 4 and 8 seconds.

Optionally, the communication application on the message initiation device may enable a user to compose an MMS message (e.g., comprising a video item or a banner item), which is transmitted as an SMS message (e.g., where a link to the video/banner rather than the video/banner itself is include in the SMS message), which may be converted back to an MMS by the message receiving device by the user clicking on or otherwise selecting the link to thereby retrieve the video item. This technique acts as message compression, and may result in reduced data usage (and associated costs) as video or banner content access (where video or banner content is normally received as an MMS message) is provided via a received SMS message rather than an MMS message.

FIG. 1E illustrates another example process according to an aspect of the present disclosure.

At block 10, a user has a communication application (e.g., a mobile communication application installed) installed on the user's device (e.g., a cell phone, other portable electronic device, a desktop computer, and/or other device).

In this example, the user is sent a series of questions which include questions used to determine the background and other profile information of the user so that the content to be obtained from the content providers (e.g., where the content providers may provide tokens to have their content placed) may be presented to suitable users so as to benefit the content provider and the user. For example, the questions may be presented via a questionnaire on the user device via the communication application after the communication application has been downloaded or otherwise installed on the user device. Optionally, in addition or instead, a profile set-up user interface may be provided via a webpage hosted by a website. The user may respond by providing some or all of the information discussed herein and/or other information which may then be stored.

As set forth in block 20, the user provides demographic information and creates a profile.

Optionally, a user may be provided with tokens (e.g., financial payments, credits, content, and/or other rewards) in exchange for permitting third party messages/content to be included in the user's messages. With respect to the content provider's portal block 100, the content provider may upload content to a server (e.g., a website server), may upload or otherwise provide content provider tokens/rewards, and select or otherwise specify the desired demographic criteria and/or other profile information to improve the focus as to where the content will be directed (e.g., to user's most receptive group who will want to acquire the content provider's products or services). Optionally, the content and/or the profile information is stored on the user device (e.g., into the communication application) after the user provides the information as set forth in block 20.

For example, as set forth in block 30, the profile may be installed on the user's cell phone and may be accessible to the communication application. Daily activity may be tracked and a daily activity report may be created by the communication application.

As set forth in block 40, the daily activity report provided by the communication application and is received by the website servers, the report is checked for errors, and the user account is credited with tokens (e.g., based on the number and/or type of third party messages/content included in the user's messages).

As set forth in block 150, a content provider report is created and transmitted to the content provider portal.

As set forth in block 50, the user profile is accurately updated with points corresponding to the amount of points/tokens assigned to the user.

As set forth in block 60, the user initiates a point redemption for a selected number of points.

As set forth in block 70, the user account is checked for errors and accuracy and then the content provider receives a reward report 120.

As set forth in block 80, the user is provided items corresponding to the redeemed points (e.g., gift certificates or other cards that are redeemable for merchandise from the content provider).

An aspect of the disclosure relates to enabling a user to register with the host of the communication application and send text messages (as defined above) through the user's portable electronic device with content tailored to the user (e.g., targeted content) after a predetermined number of text messages has been sent by the registered user. After a threshold number of text messages has been sent by the registered user, a framework, such as a bubble, will appear with the targeted content appearing on the screen of the portable electronic device (e.g., immediately after the registered user hits the send button). The selected content will be in the same bubble as previously discussed. Since the registered user is looking at the portable electronic device screen when text messaging, the registered user will immediately see the targeted content. It is not required that the receiver of the text message also be registered with the communication application host. However, if the receiver of the text message is also a registered user, a reply text message by the receiver converts the receiver into a text message sender. Thus, the registered receiver may have a separate account which tracks the number of messages/replies sent by the receiver. After a threshold number of such messages have been sent by the receiver, content may be inserted into a message being sent by the receiver. Thus, a given registered user can send messages (some or all of which may include inserted third party content) to recipients as desired. As set forth below, safeguards are optionally provided to prevent system abuse.

FIG. 2 illustrates an example text messaging sequence by a registered user. FIG. 2 also illustrates a flowchart for a new message user interface. In this example, the user logs in using the user's name and password. The user loads a new message screen, at block 200, onto the user's portable device. If the user wishes to include an attachment to the text message, the user may click an attach control at block 210 and may select an image or video at block 220. If the attachment is an image, then at block 230, the image is processed and attached to the text message. Alternatively, if the attachment is a video 240, then at block 250, the video is processed and attached to the message. At block 300, the user selects a contact (e.g., by clicking on a contact entry), and at block 310 the contact screen is loaded. The user then clicks a send control at block 400. The host records are checked at block 410 to be certain the user is a registered user, and the message is sent to the host server at block 420. The host server confirms whether content (e.g., an ad) of a content provider (e.g., an advertiser) should be sent at block 430 (if the receiver is also a registered user) or at block 430A (if the receiver is not a registered user). In one path, the user's preference are checked at block 440, an appropriate content item is selected from a current list of content items using preferences of the user at block 450, the content is embedded to a text message at block 470, and the message (with the embedded content) is relayed to the receiver's client at block 480. In a parallel path, after the content item is embedded to a text message at block 470, the message is sent through (e.g., using a built-in Android or iOS messaging application, or other third party messaging application) at block 490.

Figure 3:
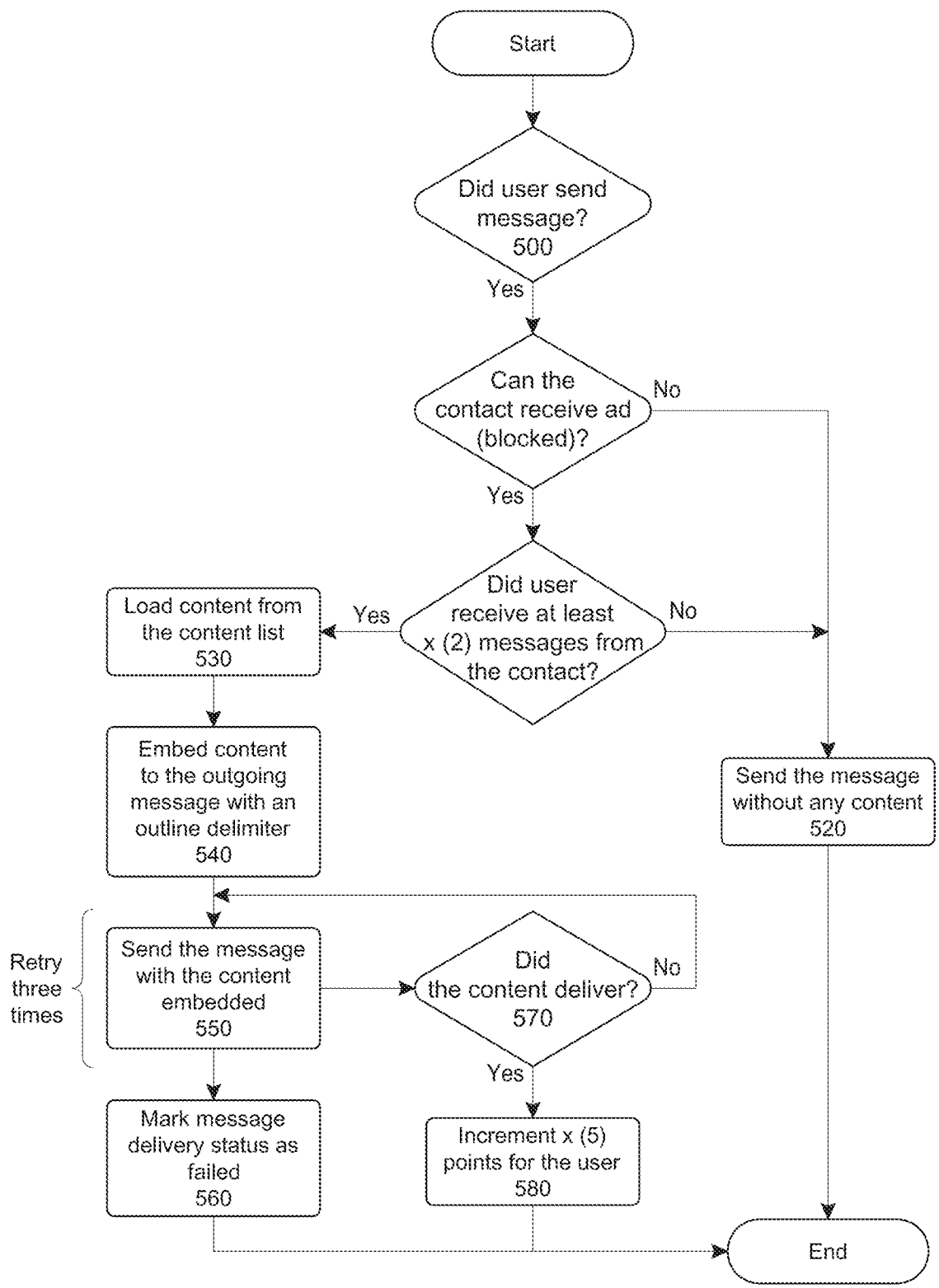
FIG. 3 illustrates another example messaging process.

Referring to FIG. 3, a verification process may be performed to ensure that the user actually sent the message. For example, at block 500, the process may query the user as to whether the user sent the text message. The process then checks as to whether the contact/recipient device is configured to receive the content item or whether the content item is blocked. If the answer is "No" (the content item is blocked), then at block 520, the user message is sent without the content item from the content provider. On the other branch of the tree, if the answer is "Yes," (the contact/recipient device is configured to receive the content item) then the communication application determines, at block 510, whether the user received at least a threshold number (e.g., two (2) messages) from the contact, and if so, at block 503 the selected content is loaded from the content list. At block 540, the content is embedded in the outgoing message with an outline delimiter for the content. At block 550, the user message is transmitted with the selected content embedded. If the message transmission fails, the transmission may be attempted a predetermined number of times (e.g., three times). If, after the predetermined number of attempts, the message transmission has not succeeded, then the system marks the message delivery as failed at block 560. If, at block 570, a determination is made that the message has been delivered, at block 580 the user is assigned a corresponding number of points for the delivered message.

Figure 4:
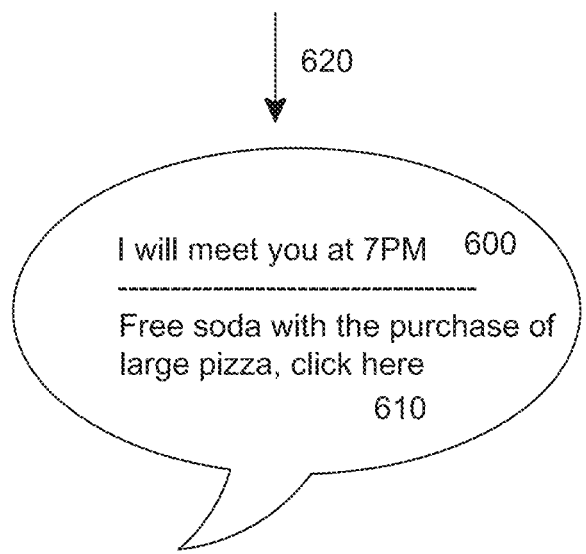
Figure 5:
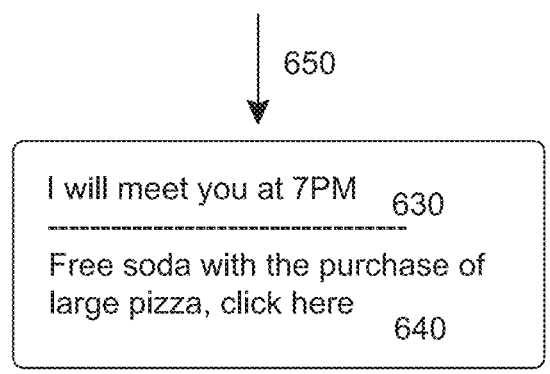
Figure 6:
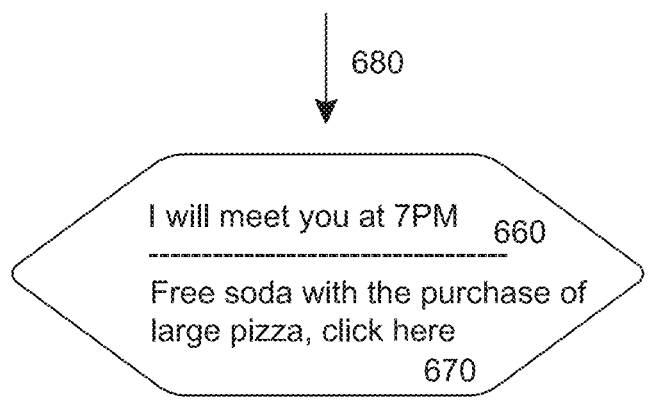

If the message was successfully delivered, then the text message and content provider content/message are visible together in a framework as illustrated in the examples of FIGS. 4 through 6. FIG. 4 is an illustration of a user text message 600 and content provider content/message 610 in a message bubble 620. FIG. 5 is an illustration of a user text message 630 and content provider content/message 640 within a message rectangle 650. FIG. 6 is an illustration of a user text message 660 and content provider content/message 670 within a message hexagon 680. FIG. 7 is an illustration of a user text message 700 with content provider content/message 710 positioned below the user text message 700, where there is not message framework/outline around the user text message 700 and the content provider content/message 710.

In an example optional process, after logging on (e.g., by inputting the registered user's name and password), the user signs up and receives and downloads the communication application to the user device. When the user is asked to register and create an account, the user may provide certain information via the user's device, which may in turn be transmitted to a webserver. Such information may include the mobile number of the user. The user may request or indicate that the user would like to provide additional information (e.g., content preferences). The email address of the user may also be transmitted to the webserver. The user creates may create a user password so that only the user will be able to access the user's account. The user may provide demographic information, such as gender and the country where the user resides, and the user's zip/postal code or the like.

The user may be provided with additional rewards and bonus points if the user is willing to provide certain other sensitive information (e.g., which many users may not be inclined to give out initially). A user may become accustomed to the system and processes disclosed herein, and will better come to understand that the user is being provided points and benefits without having to modify the user's behavior. For example, the user may be provided compensation (e.g., earning 5 points or 5 cents for each item of content/message of a content provider included in the user's messages and sent via the user's device(s)).

The user may redeem the points earned (e.g., for product or services, such as electronic gift cards, direct cash withdrawals, charity donations, school tuition, etc.). Optionally, the system may then (e.g., after the user has redeemed points for a threshold number of items) prompt the user to provide additional information such as the user's age, the user's gender, where the user lives, if the user is in school, what the user is studying in school, what grade the user is in, if the user is at work, what jobs the user performs, the user's income or an income range (e.g., on an annual basis), the types of products and services that the user usually purchases, the types of products and services the user would like to purchase within a specified time frame (e.g., the next several months), and/or other information, such as information that the user ordinarily would not provide unless given an incentive.

The mobile communication application program may then automatically match the user with the specific companies and brands that advertise products or services that will be of most interest for acquisition by the specific user based upon the specific user information as above. Additional questions may be asked of the user, perhaps of a more personal nature, in order to enable the user to provide more detailed information (e.g., the income earned by the user, the age of the user, the religion of the user; if the user is going to school, where the user is going to school, what the user is studying, whether the user has graduated from school, where the user is working; the nature of the user's employment; the user's interests, the user's hobbies and what products and services the user has acquired within a specified time period (e.g., the past year) and/or other information).

Another example process will now be described. In this example, the user will receive the content/message as selected by a third party or other content provider (e.g., based on the user's demographic information and/or other user information) that will be embedded in a text message being composed on the user's device. The phrase "text message" may include SMS text messaging where the message is transmitted wirelessly through an SMS text messaging infrastructure or text messaging which uses a wireless carrier that the individual is using for communicating messages.

The content provider message/content may then be selected based at least in party upon the text message sent from the user's device to another device (e.g., a portable electronic device) having the application software downloaded or otherwise installed thereon. Third party message/content may be embedded periodically in the user's messages (e.g., every message, every other message, every third message, every fourth message, every fifth message, during selected time periods, or in any other selected sub-group of text messages to be sent by the user to a destination). If the text message is displayed via the user and/or recipient device, such display occurrence may be recorded in a computer database, thereby indicating that the user used the text message with the third party message/content a given number of times a given day.

The communication application may access the third party message/content and transform third party message/content into a transmittable message/content so that the third party message/content can be embedded into a text message as described above, and transmitted by the user (who downloaded the communication application on the user's device) to a receiver optionally having the communication application installed thereon. The messages with the embedded third party message/content may be transmitted according specified criteria (e.g., at specific selected time periods, each text message, every other text message, etc.). Thus, a message between two user device may be used to interject a message or other content from a third party.

In an example scenario, a user sends a text message to a friend via the user's device (e.g., a mobile device such as a cell phone, with the software communication application installed thereon). If the same user sends the same text or a comparable text to the friend, the mobile communication application is programmed so that after a given number of text messages, whether it be every single one, every other one, every third one, every fourth one, every fifth one etc., at the end of the text message, a specific selected third party message/content item will appear. Optionally, the content will appear immediately below the selected number of text messages within the same framework as the user message text. The framework may be any shape (e.g., such as a bubble, star, rectangle, or other shape or size). Optionally, the framework will be a bubble so that the specific text message that triggers the third party message/content will appear within the same bubble as the text message and immediately beneath the text message. Optionally, the text messages and the third party message/content immediately below may be displayed in a running series without a framework around it (e.g., "Drink Soda" or "Eat Pizza" or "Buy Ice Cream"). In this way, the person sending or receiving the message will see the third party message/content.

Thus, a content provider is enabled to place directed messages/content directly to a subset of users who are more likely to be users of a specific product or service offered by the content provider. Further, such directed content/message is provided directly and personally to an individual user as opposed to an overall multimedia platform, such as a television show, radio show or a billboard sign. The third party message/content is transformed from a general third party message/content to an embedded third party message/content contained within the mobile communication application and embedded so that the message/content appears on a screen when the user of the user device sends a text message or other communication to another user. Through this transformation, the third party message/content may appear on a screen of a personal electronic device (e.g., a cell phone, tablet computer, wearable device, laptop, etc.) where the user will be looking directly at the screen since the user is reading the text message and therefore will also be viewing the third party message/content.

In addition, the user is motivated to transmit text messages with third party content because the user optionally will be receiving tokens (e.g., reward points) which the user can redeem for products, services, currency, etc., such as for products or services depicted or discussed in the content/message provided by the third party, where the third party may be a provider of such product/service.

Improvements may be provided to even better enhance the effectiveness of the communication application. As similarly, discussed elsewhere herein, among the information requested and downloaded from the user to help better select and direct the appropriate third party message/content to the user may include some or all of the following: an email address, a password that is personal to the user so only that user can access the user's account record (which may include account information such as how many points that user has earned, providing further motivation to continue to use services described herein) and demographic data (e.g., gender, the country where the user is located, the user's physical address or a portion thereof (e.g., zip code), or other user location information (e.g., geolocation data obtain from a GPS radio, cell tower triangulation, Wi-Fi data, and/or the like)).

Optionally, the communication application will automatically match the user and cell phone or other portable electronic device of the user with the companies and brands that are utilizing the present apparatus and methods in order to match as closely as possible the type of products and services that the company provides with the user to whom the third party messages/content about those products and services are directed.

To obtain even more detailed information so that the match may be even more precise, the user may be provided with additional bonus points or tokens if the user is willing to provide additional information such as age, whether the user is in school, what grade the user is in, and what the user studying; if the user is working, where the user is employed, the user's income, family members, household family members, family members the user is not living with, the nature and type of entertainment that the user enjoys (e.g., cable, streaming video, movies in theaters, plays, etc.).

Further, the user may be provided an opportunity to choose the types of content/messages that the user wishes to receive (where the products or services provided by the content provider are of a particular interest to that user).

The user may also be provided with information to enable the user to change/edit the demographic information provided, assign additional cell or other phone numbers to the user's account so that if the user has more than one electronic device, the user may benefit from the utilization of the communication services described herein on several devices. The content provider may also be provided with information concerning how effective the content provider's content/message is and therefore, may have the opportunity to change the nature of the content/message to better improve the content/message effectiveness (e.g., in encouraging the user to utilize the content and obtain products or services discussed and/or depicted in the content/message). The content provider may also be provided the opportunity to modify the products that are provided to the user based upon the points earned by the user.

As the user becomes more comfortable with the communication application, the user may be prompted to provide still more detailed information about the user (e.g., in exchange for additional points or tokens or to receive content/messages more closely targeted to the user's interests). The content provider may also be provided the opportunity to obtain further statistical data so that specific content for products or services that a user has demonstrated a great interest in acquiring may be run more frequently on that user's device.

In addition, the system may determine the times of the day and days of the week when a user most frequently used the communication application, how the communication application is used (e.g., to send text messaging, to access the user's account, to receive messages, etc.), and whether the user also generated more sales leads through providing the information to the user's friends, relatives, etc. who also then subsequently obtained the communication application (e.g., to utilize and receive the benefits of the services described herein).

The compensation to be allocated between the provider of the mobile communication application and the user may be adjusted periodically.

As discussed herein certain optional transformations may include one or more of the following:

1. The downloadable communication application may transform an ordinary text message into a source of third party content/messages.

2. The downloadable communication application transforms the way third party messages/content is directed to a specific focus group of users, such as users who are motivated to view such third party messages/content because the third party messages/content is presented together with text messages the user is entering from text messages received by the user from user contacts (e.g., friends, business contacts, etc.).

3. The person receiving the text message may be a registered user with the real-time messaging platform but does not have to be a registered user. If the person receiving the text message is a registered user, then the registered receiving person may also send text messages, and after a specified number of text messages are sent (e.g., 1 message, 2 messages, 5 messages, or other specified number of messages) may receive a reward (e.g., points/tokens) as described above. The registered receiving user may also have the same limitations on the number of text messages that may be sent to the same person for rewards (limited over a certain period of time), so there are no more than a specified number of messages (e.g., two text messages) sent over a specified time period (e.g., a twenty-four hour period) to the same person which are entitled to a reward. In addition, the receiving person may be non-registered so that receiving person may be able to receive the text message but cannot resend it either to the user or to a third party as a registered receiving person could do.

Figure 8:
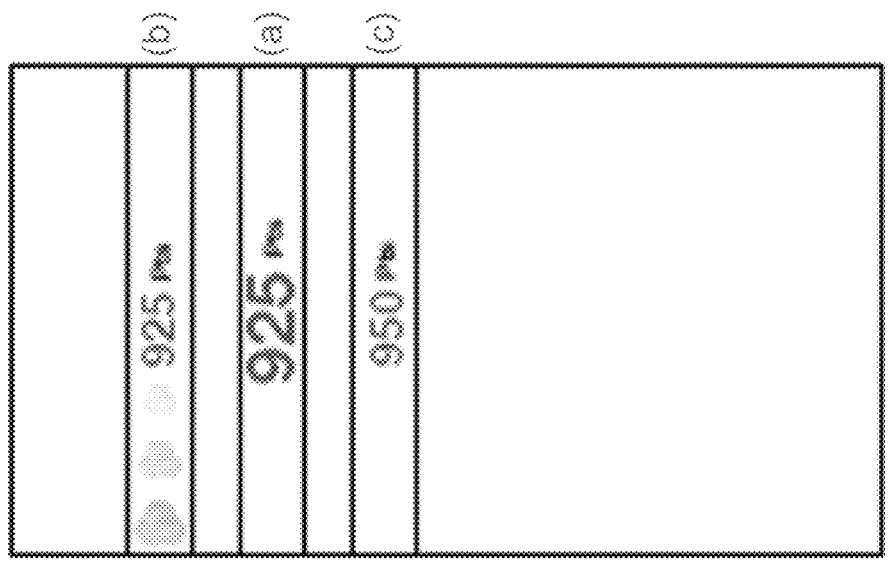

FIG. 8 illustrates example user interfaces depicting user points. The user interfaces may utilize animation to depict points being added to a user's current points. For example, FIG. 8(*a*) illustrates a current point balance. FIG. 8(*b*) illustrates an icon (e.g., coins) floating or otherwise moving to the current point balance to indicate that points are being added to the user's existing points. FIG. 8(*c*) illustrates a new point balance present after the animation is concluded. The animation advantageously clearly depicts to the user the new earned points, without having to occupy display space on a non-transient basis.

Figure 9:
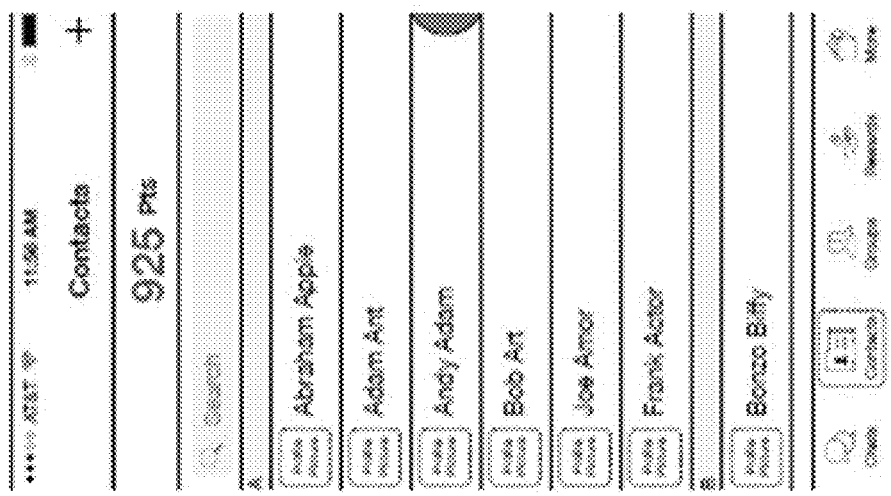

FIG. 9 illustrates an example user interface that may be presented on the user device that efficiently displays both the user's contact database (from which a user may select contact to which a message is to be addressed to) and user points. This approach reduces the need to navigate to multiple user interfaces to select message addressees and view the user's points.

Figure 10:
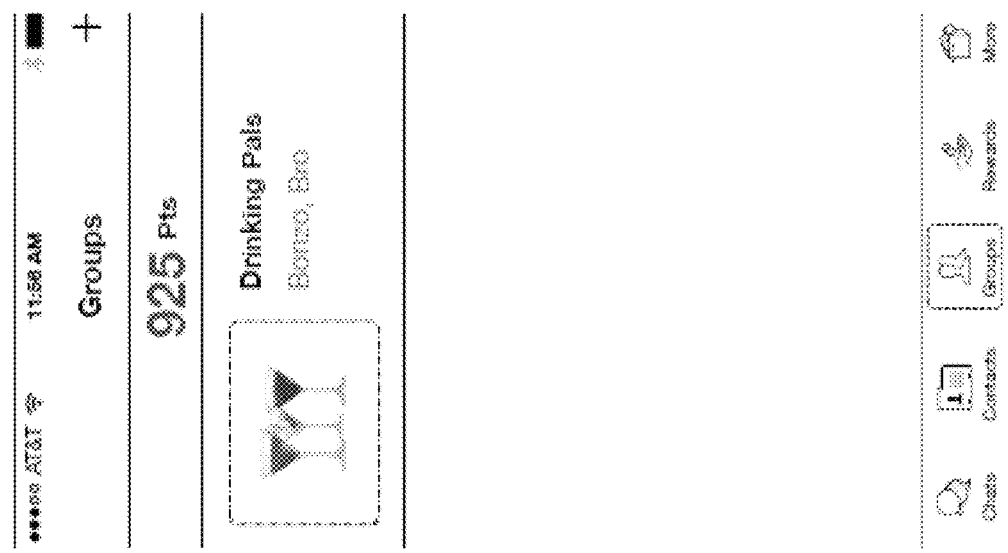

FIG. 10 illustrates an example user interface that may be presented on the user device that efficiently displays both communication groups defined by the user and user points. As similarly discussed above with respect to claim 9, this approach reduces the need to navigate to multiple user interfaces to select message addressees and view the user's points.

Figure 11:
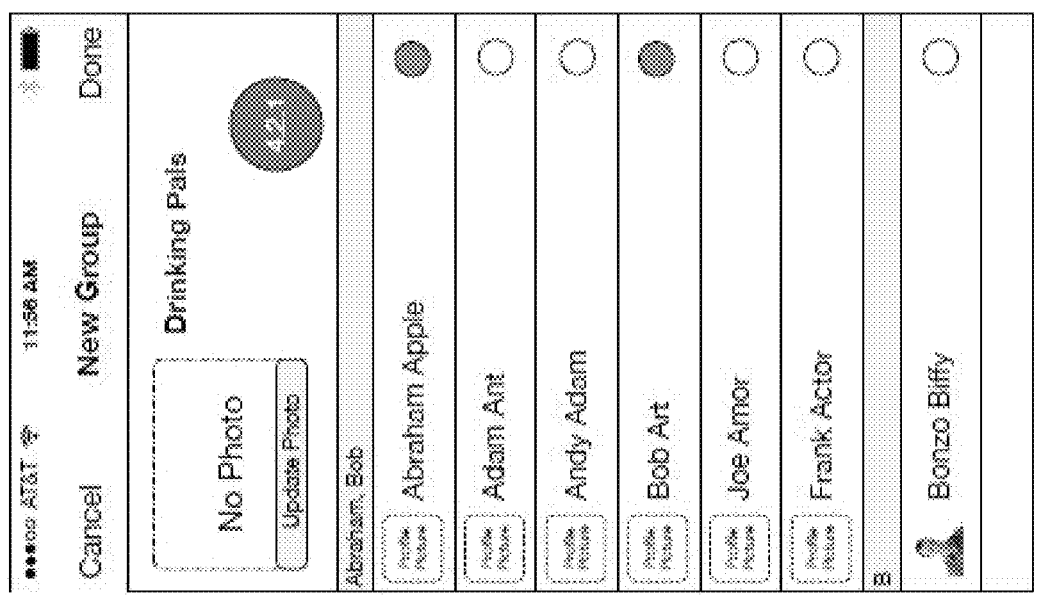

FIG. 11 illustrates an example user interface that may be presented on the user device that enables a user to define a communication group. For example, the user may define a communication group by selecting (e.g., clicking on) contacts accessed from the user's contact data store. An interface is provided that enables the user to assign a name and/or image (e.g., a photograph or illustration) to the communication group.

Figure 12:
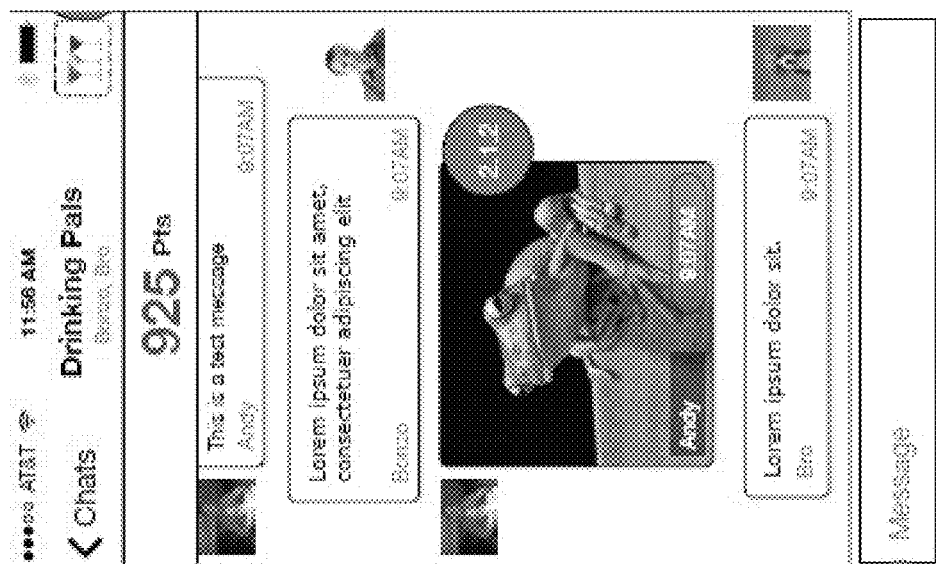

A user may view chats/communication sessions by selecting a chat from a list of chats displayed in association with the corresponding chat participants (e.g., other users or communication groups). FIG. 12 illustrates an example user interface that may be presented on the user device that efficiently displays both selected chats and user points.

Figure 13:
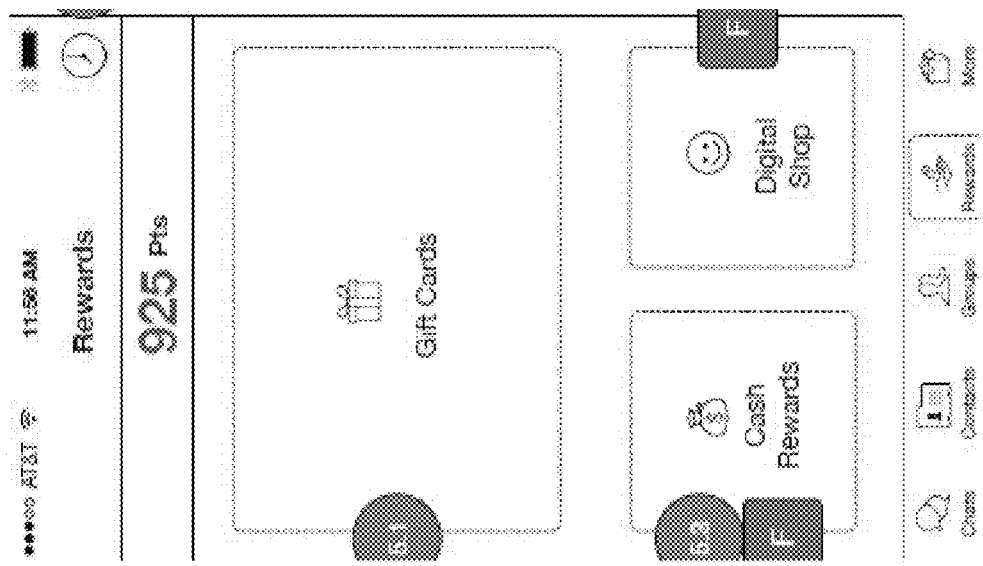

FIG. 13 illustrates an example user interface that may be presented on the user device that efficiently displays both user points and items (e.g., gift cards 5.2, digital content (e.g., games, videos, music, etc.), monetary rewards 5.3) which may be acquired by the user by applying corresponding user points. Optionally, rather than listing the available rewards, the user interface may include text/images corresponding to reward categories, which may then be selected. In response to the user selecting a category, the actual available rewards may be presented. This technique provides easier-to-use interfaces, and reduces the amount of scrolling to access a given reward entry. The user interface may also include controls via which the user can access the chat user interface, the contacts user interface, the groups definition user interface, and/or other user interfaces.

Once the user applies points, the user may be asked to confirm the application prior to the actual application of the points to the reward.

Optionally, a user interface is provided via which the user can designate a recipient of a given reward. The reward may then be electronic transmitted to the designated recipient.

Figure 14:
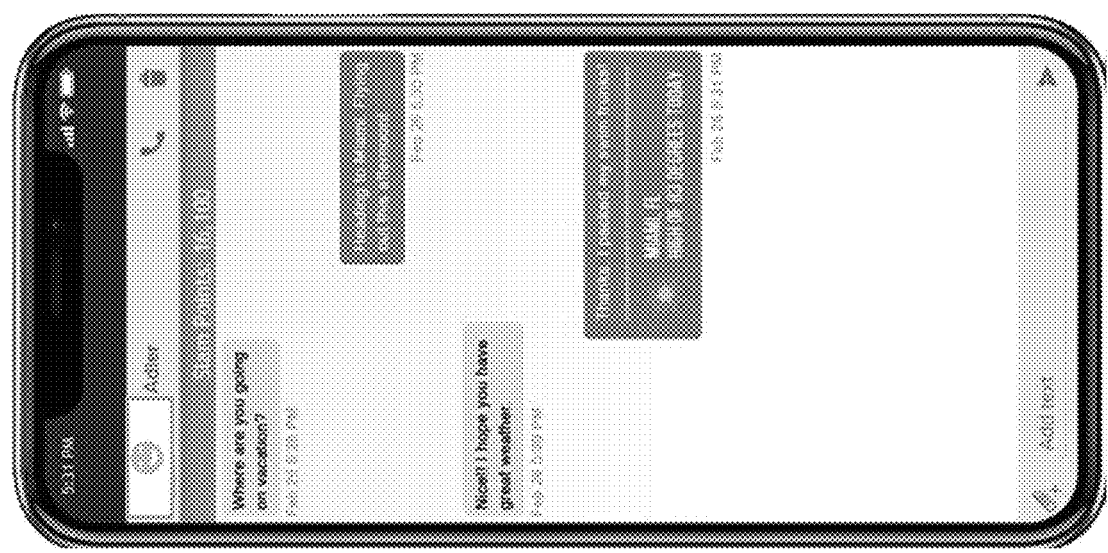

FIG. 14 illustrates an example chat conversation between two people via a chat user interface presented on a user device via the communication application. In this example, a third party message (including graphics and text) is inserted into the second message from the user of the user device. The chat text indicates that the user of the user device is going on a trip to Miami, Fla. The real-time messaging platform, based on an analysis of the chat text (using techniques described elsewhere herein), determines that a weather report message for Miami from a weather server is an appropriate third party message to insert into the user's second message, and causes the weather report message to be inserted into the user's second message (via the communication application hosted on the user device). In addition, the number of user points assigned to the user is presented in conjunction with the chat conversation, and may be updated in real time once the message with the third party content is sent or is received by the message recipient device.

Optionally, data discussed herein may be acquired and calculated and tabulated in order to perform various permutations and calculations to determine improvements to the operation of the example processes described herein (e.g., which include particular companies or industries that benefit from these types of messages/content), determine the content message that is most effective, and/or determine the number of messages/content items sent and whether they were sent at specific times of the day and/or on specific days. In addition, messages/content items of one kind or another may have a different effect on users if they are in different countries or in different locations within a particular company which may also be factored into the messages/content items that are provided to that particular sub-group of persons depending upon the numerous variables about that person that are obtained and continuously updated.

In order to avoid fraud or other misuse (which may be attempts to improperly obtain rewards, such as those discussed herein), the user may agree to various terms and conditions as part of the opportunity to utilize the communication application and services described herein. Examples include, but are not limited to, a user being instructed to send only a limited number of messages over a given period of time (e.g., not more than two messages a day). For example, a user may only be permitted to send a text message to another person for a specific limited number of times over a specific period of time, for example such as no more than two text messages within any twenty-four hour period. The user may also be prevented from sending a third party message/content item with a text message unless a certain threshold number of text messages have been sent by the user within a period of time (e.g., ten text messages received or sent in 72 hours). If the user violates these rules, a warning notification may be automatically generated and provided to the user. If the user continues to violate the rules after a selected period of time (e.g., (one or two days), then the user's communication application may be disabled to prevent further text messages from being sent by the communication application.

An example process generates an account warning notification and provides the notification to a content provider in response to detecting that an account balance has fallen below a specified threshold. For example, the notification may indicate that the content provider needs to maintain a specified minimum account balance (e.g., to provide compensation for the provider's content that has been inserted into user messages) and advise the content provider if the balance has fallen below a certain amount or percentage of a specified funding level. The system may provide the webmaster and system operator with the opportunity to postpone the insertion of a content provider's content into user messages in response to detecting that the content provider's balance is less than a certain amount. If the content provider continues to violate certain rules, then the content provider's content may be no longer be inserted into user messages, and the content may be deleted from cache and other system memory.

Thus, disclosed herein are systems and methods that facilitate the insertion of third party message/content into messages between two or more users without revealing to the third party the identities of the two or more users in a manner transparent to the two or more parties. Content providers are also enabled to direct messages/content items to groups of users that may be most or relatively more interested in such messages/content items.

Various methods and systems for embedding content and messages into a user's message, that may be utilized with methods and systems disclosed herein, are described in U.S. patent application Ser. No. 15/148,846, the content of which is incorporated by reference herein in its entirety.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces. Further, processing of the various components of the illustrated systems can be distributed across multiple machines, networks, and other computing resources, or may comprise a standalone system. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone application, computer application, a short messaging service message (e.g., SMS, MMS, etc.), instant messaging, email, push notification, audibly, and/or otherwise.

The user terminals, devices, and systems described herein may be in the form of a mobile communication device (e.g., a cell phone), laptop, tablet computer, interactive television, game console, media streaming device, head-wearable display, networked watch, etc. The user terminals, devices, and systems may optionally include displays, user input devices (e.g., touchscreen, keyboard, mouse, voice recognition, etc.), network interfaces, etc.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. Any claims intended to be treated under 35 U.S.C. § 112(f) will begin with the words "means for," but use of the term "for" in any other context is not intended to invoke treatment under 35 U.S.C. § 112(f).

Accordingly, the applicant reserves the right to pursue additional claims after filing this application, in either this application or in a continuing application.

What is claimed is:

1. A communication system comprising:
a network interface;
at least one computing device;
a non-transitory computer-readable medium having computer-executable instructions stored thereon that, if executed by the at least one computing device, cause the at least one computing device to perform operations comprising:
receiving over the network interface from a communication application installed on a first communication device of a first user:
an identifier associated with the first user and/or an identifier associated with the communication application installed on the first communication device;
an indication that a messaging service message composed by the first user is being directed to a first electronic destination address associated with a second user;
an identification of keywords performed by the communication application installed on the first communication device of the first user, present in the messaging service message composed by the first user, wherein the identified keywords present in the messaging service message composed by the first user are associated with respective weightings;
based at least in part on:
the identification of keywords performed by the communication application installed on the first communication device of the first user present in the messaging service message composed by the first user and associated keyword weightings for the identified keywords present in the messaging service message composed by the first user, and
using a message transmission history of the first user;
enabling selection of a message of a first entity;
causing the selected message of the first entity to:
be displayed by the communication application installed on the first communication device of the first user in association with the messaging service message composed by the first user; and
included in the messaging service message when the messaging service message is transmitted from the first user to the first electronic destination address without traversing the communication system to the second user,
wherein the first entity does not receive the identity of the first user or the second user.

2. The communication system as defined in claim 1, wherein the selection of the message of the first entity is performed using a message transmission history of the first user that indicates how many messaging service messages have been transmitted by the first user, wherein the operations further comprise enabling the message of the first entity to be displayed communication application installed on the first communication device of the first user within the message framework that also frames the messaging service message composed by the first user at least partly in response to determining that at least a first threshold number of messaging service messages have been transmitted by the first user using the communication application since a third party message has been included in a messaging service message transmitted by the communication application.

3. The communication system as defined in claim 1, the operations further comprising causing the selected message of the first entity to be displayed by the communication application installed on the first communication device of the first user within a message framework that also frames the messaging service message composed by the first user, the message framework having a shape selected from a plurality of message framework shapes.

4. The communication system as defined in claim 1, the operations further comprising enabling the selected message of the first entity to be displayed by the communication application installed on the first communication device of the first user within a message framework that also frames the messaging service message composed by the first user, wherein the message of the first entity to be displayed within the message framework below the messaging service message composed by the first user, with a visual delimiter contained within the message framework that visually distinguishes the message of the first entity from the messaging service message composed by the first user.

5. The communication system as defined in claim 1, wherein enabling selection of a message of a first entity further comprises the operations of comparing keywords included in the messaging service message with metadata associated with messages of one or more entities and identifying one or more messages of the one or more entities that have metadata that correspond to the keywords included in the messaging service message.

6. The communication system as defined in claim 1, the operations further comprising:
receiving over the network interface from a communication application installed on a communication device of a third user:
an identifier associated with the third user and/or an identifier associated with the communication application installed on the communication device of the third device;
an indication that a messaging service message composed by the third user is being directed to an electronic destination associated with a fourth user;
an identification of keywords present in the messaging service message composed by the third user;
an identification of the fourth user;
determining, using the identification of the fourth user, that the fourth user has the communication application installed on a communication device associated with the further;
accessing a record associated with the third user using the identifier associated with the third user and/or the identifier associated with the communication application installed on the third user communication device;
accessing a record associated with the fourth user using the identification of the fourth user, the record associated with the fourth user comprising demographic and/or preference data;
based at least in part on the identification of keywords present in the messaging service message composed by the third user and on a message transmission history of the third user, enabling selection of a message of a second entity;
based at least in part on the identification of keywords present in the messaging service message composed by the third user and data included in the record associated with the fourth user, enabling selection of a message of a third entity causing the selected message of the second entity to:
be displayed by the communication application installed on the communication device of the third user within a message framework that also frames the messaging service message composed by the third user;
causing the selected message of the third entity to:
be displayed by the communication application installed on the communication device of the fourth user within a message framework that also frames the messaging service message composed by the third user.

7. The communication system as defined in claim 1, wherein the record associated with the first user further comprises location data, the operations further comprising:
selecting the message of the first entity based in part on the location data.

8. The communication system as defined in claim 1, wherein the communication system is inhibited from receiving proper names, addresses, and phone numbers included in the messaging service message.

9. The communication system as defined in claim 1, the operations further comprising:
updating a keyword dictionary stored on the first communication device is out of date with a set of keywords stored remote from the first communication device.

10. The communication system as defined in claim 1, wherein the selected message of the first entity comprises a photographic image, graphic content, and/or video content.

11. The communication system as defined in claim 1, wherein the selected message of the first entity comprises visual content associated with a network resource locator, wherein selection of the visual content by the first user or the second user, causes a resource to be accessed using the network resource locator.

12. A computer implemented method of modifying a messaging service message, comprising:
receiving at a mobile device of a first user, via an instantiation of a first application installed on the mobile device of the first user, content provided by a content provider;
detecting that the first user has instructed the first application installed on the mobile device of the first user to transmit a first messaging service message to a device of a second user associated with corresponding second user identification information, the first messaging service message including a message comprising text entered by the first user,
wherein the message comprising text entered by the first user does not include the content from the content provider;
at least partly based on an identification of keywords present in the first messaging service message, the identification of keywords performed using the first application installed on the mobile device of the first user, and associated keyword weightings for the identified keywords present in the first messaging service message composed by the first user, and
a message transmission history of the first user;
causing, at least in part, the first messaging service message to automatically include the content from the content provider with the message entered by the first user; and
causing at least in part, the content from the content provider to be displayed in association with the message entered by the first user when displayed on the device of the second user without providing the content provider with the corresponding second user identification information.

13. The computer implemented method as defined in claim 12, wherein the first messaging service message is an SMS message or MMS message.

14. The computer implemented method as defined in claim 12, the method further comprising causing the content provided by the content provider to be displayed on the device of the second user within a message framework that also frames the message entered by the first user.

15. The computer implemented method as defined in claim 12, the method further comprising:
tracking a number of items of content provided by one or more content providers that are transmitted via messaging service messages from the mobile device of the first user; and
generating a report indicating the number of items of content provided by one or more content providers that are transmitted via messaging service messages from the mobile device of the first user.

16. The computer implemented method as defined in claim 12, the method further comprising:
tracking a number of items of content provided by one or more content providers that are transmitted via messaging service messages from the mobile device of the first user within a first period of time;
determining whether the number of items of content provided by one or more content providers that are transmitted via messaging service messages from the mobile device of the first user within the first period of time at least meets a first threshold; and
at least partly in response to determining that the number of items of content provided by one or more content providers that are transmitted via messaging service messages from the mobile device of the first user within the first period of time at least meets a first threshold, inhibiting content from one or more content providers from being included in messaging service messages from the mobile device of the first user for a second period of time.

17. The computer implemented method as defined in claim 12, the method further comprising, causing the content from the content provider to be displayed on the device of the second user adjacent to, and below the message entered by the first user.

18. The computer implemented method as defined in claim 12, the method further comprising, causing, at least in part, a graphic separator to be displayed visually separating the content from the content provider from the message entered by the first user when displayed on the device of the second user.

19. A system comprising:
a network interface;
at least one computing device;
a non-transitory computer-readable medium having computer-executable instructions stored thereon that, if executed by the at least one computing device, cause the at least one computing device to perform operations comprising:
receiving over the network interface from a communication application installed on a first communication device of a first user:
a first identifier;
an indication that the first user has activated a message transmit control to cause a messaging service message composed by the first user to be transmitted to a first electronic destination associated with a second user associated with corresponding second user identification information;

an identification of keywords performed by the communication application installed on a first communication device of a first user present in the messaging service message composed by the first user;

based at least in part on the identification of keywords present by the communication application installed on a first communication device of a first user in the messaging service message composed by the first user and associated keyword weightings for the identified keywords present in the first messaging service message composed by the first user enabling selection of a message of a first entity and on a message transmission history of the first user;

enabling the selected message of the first entity to:
be displayed by the communication application installed on the first communication device of the first user together with the messaging service message composed by the first user, and
be included in the messaging service message when the messaging service message is transmitted to the second user without providing the first entity with the corresponding second user identification information.

20. The system as defined in claim 19, wherein the record associated with the first user indicates how many messaging service messages have been transmitted by the first user using the communication application since a third party message has been included in a messaging service message transmitted by the communication application, wherein the operations further comprise enabling the message of the first entity to be displayed communication application installed on the first communication device of the first user within a message framework that also frames the messaging service message composed by the first user at least partly in response to determining that at least a first threshold number of messaging service messages have been transmitted by the first user using the communication application since a third party message has been included in a messaging service message transmitted by the communication application.

21. The system as defined in claim 19, the operations further comprising: causing the selected message of the first entity to be displayed by the communication application installed on the first communication device of the first user within a graphic message framework together with the messaging service message composed by the first user.

22. The system as defined in claim 19, the operations further comprising enabling the message of the first entity to be displayed within a message framework together with and below the messaging service message composed by the first user, with a visual delimiter contained within the message framework that visually distinguishes the message of the first entity from the messaging service message composed by the first user.

23. The system as defined in claim 19, wherein enabling selection of a message of a first entity further comprises the operations of comparing keywords included in the messaging service message with metadata associated with messages of one or more entities and identifying one or more messages of the one or more entities that have metadata that correspond to the keywords included in the messaging service message.

24. The system as defined in claim 19, the operations further comprising:

receiving over the network interface from a communication application installed on a communication device of a third user:
an identifier associated with the third user and/or an identifier associated with the communication application installed on the communication device of the third device;
an indication that a messaging service message composed by the third user is being directed to an electronic destination associated with a fourth user;
an identification of keywords present in the messaging service message composed by the third user;
an identification of the fourth user;

determining, using the identification of the fourth user, that the fourth user has the communication application installed on a communication device associated with the further;

accessing a record associated with the third user using the identifier associated with the third user and/or the identifier associated with the communication application installed on the third user communication device;

accessing a record associated with the fourth user using the identification of the fourth user, the record associated with the fourth user comprising demographic and/or preference data;

based at least in part on the identification of keywords present in the messaging service message composed by the third user and on a message transmission history of the third user, enabling selection of a message of a second entity;

based at least in part on the identification of keywords present in the messaging service message composed by the third user and data included in the record associated with the fourth user, enabling selection of a message of a third entity causing the selected message of the second entity to:
be displayed by the communication application installed on the communication device of the third user within a message framework that also frames the messaging service message composed by the third user;

causing the selected message of the third entity to:
be displayed by the communication application installed on the communication device of the fourth user within a message framework that also frames the messaging service message composed by the third user.

25. The system as defined in claim 19, wherein the record associated with the first user further comprises location data, the operations further comprising:
selecting the message of the first entity based in part on the location data.

26. The system as defined in claim 19, wherein the system is inhibited from receiving proper names, addresses, and phone numbers included in the messaging service message.

27. The system as defined in claim 19, the operations further comprising:
detecting that a keyword dictionary stored on the first communication device is out of date; and
based at least in part on detecting that a keyword dictionary stored on the first communication device is out of date, synchronizing the keyword dictionary stored on the first communication device is out of date with a set of keywords stored on the system.

28. The system as defined in claim 19, wherein the selected message of the first entity comprises a photographic image, graphic content, and/or video content.

29. The system as defined in claim 19, wherein the selected message of the first entity comprises visual content associated with a network resource locator, wherein selection of the visual content by the first user or the second user, causes a resource to be accessed using the network resource locator.

\* \* \* \* \*

UNITED STATES PATENT AND TRADEMARK OFFICE
CERTIFICATE OF CORRECTION

PATENT NO. : 10,873,548 B2  
APPLICATION NO. : 16/831129  
DATED : December 22, 2020  
INVENTOR(S) : Brown et al.

Page 1 of 1

It is certified that error appears in the above-identified patent and that said Letters Patent is hereby corrected as shown below:

On the Title Page

On page 2, in Column 1, item (63), Related U.S. Application Data, Line 1, delete "continuation-in-part" and insert -- continuation --.

On page 2, in Column 1, item (63), Related U.S. Application Data, Line 3, delete "continuation" and insert -- continuation-in-part --.

In the Specification

In Column 9, Line 60, delete "1028" and insert -- 102B --.

In Column 10, Line 5, delete "1028" and insert -- 102B --.

In Column 12, Line 1, delete "1148" and insert -- 114B --.

In Column 12, Line 22, delete "1128" and insert -- 112B --.

In Column 23, Line 58, delete "(one" and insert -- one --.

In the Claims

In Column 27, Line 59, Claim 2, delete "displayed communication application" and insert -- displayed by the communication application --.

In Column 30, Line 35, Claim 20, delete "displayed communication application" and insert -- displayed by the communication application --.

Signed and Sealed this  
Second Day of March, 2021

Drew Hirshfeld  
*Performing the Functions and Duties of the*  
*Under Secretary of Commerce for Intellectual Property and*  
*Director of the United States Patent and Trademark Office*